(12) United States Patent
Tsotsis et al.

(10) Patent No.: US 11,174,163 B2
(45) Date of Patent: Nov. 16, 2021

(54) BIOGAS UPGRADING TECHNOLOGY FOR POWER GENERATION

(71) Applicant: UNIVERSITY OF SOUTHERN CALIFORNIA, Los Angeles, CA (US)

(72) Inventors: Theodore Tsotsis, Huntington Beach, CA (US); Richard Prosser, Los Angeles, CA (US); Mingyuan Cao, Los Angeles, CA (US); Sasan Dabir, Los Angeles, CA (US)

(73) Assignees: University of Southern California, Los Angeles, CA (US); ES Engineering Services, LLC, Orange, CA (US)

( * ) Notice: Subject to any disclaimer, the term of this patent is extended or adjusted under 35 U.S.C. 154(b) by 189 days.

(21) Appl. No.: 15/966,884

(22) Filed: Apr. 30, 2018

(65) Prior Publication Data

US 2018/0312400 A1 Nov. 1, 2018

Related U.S. Application Data

(60) Provisional application No. 62/491,413, filed on Apr. 28, 2017.

(51) Int. Cl.
*C01B 3/26* (2006.01)
*C10G 35/04* (2006.01)
*C01B 3/38* (2006.01)

(52) U.S. Cl.
CPC ............ *C01B 3/26* (2013.01); *C01B 3/38* (2013.01); *C10G 35/04* (2013.01); *C01B 2203/0233* (2013.01); *C01B 2203/0405* (2013.01); *C01B 2203/1058* (2013.01); *C01B 2203/1064* (2013.01); *C01B 2203/1241* (2013.01); *C01B 2203/84* (2013.01); *C10G 2300/1011* (2013.01)

(58) Field of Classification Search
CPC ........................................................ C01B 3/26
See application file for complete search history.

(56) References Cited

U.S. PATENT DOCUMENTS

| | | | | |
|---|---|---|---|---|
| 5,512,108 A | * | 4/1996 | Noreen | B01D 53/32 136/253 |
| 9,243,537 B1 | * | 1/2016 | Ge | F01N 13/009 |
| 9,700,747 B2 | | 7/2017 | Tsotsis et al. | |
| 2007/0029264 A1 | * | 2/2007 | Bowe | C02F 1/36 210/603 |
| 2008/0302013 A1 | * | 12/2008 | Repasky | B01J 12/007 48/127.9 |

(Continued)

OTHER PUBLICATIONS

Dabir, S. et al., "Feasibility Study of Biogas Reforming to Improve Energy Efficiency and to Reduce Nitrogen Oxide Emissions," Ind. Eng. Chem. Res. 2017, 56, 1186-1200.

*Primary Examiner* — Paul A Wartalowicz
(74) *Attorney, Agent, or Firm* — Brooks Kushman P.C.

(57) ABSTRACT

A method for powering an internal combustion engine or other device powered by combustion includes a step of feeding a first stream of biogas to a catalytic reforming reactor in which the first stream contacts oxygen to form a first product stream comprising synthesis gas. The first product stream is combined with a second stream of biogas to form a second product stream. The second product stream is provided to a device powered by combustion. A system implementing the method is also provided.

13 Claims, 12 Drawing Sheets

(56) References Cited

U.S. PATENT DOCUMENTS

| | | | |
|---|---|---|---|
| 2009/0220394 A1* | 9/2009 | Woods | B01J 8/0407 422/600 |
| 2010/0178226 A1* | 7/2010 | Makkee | B01J 23/8926 423/245.1 |
| 2016/0347613 A1* | 12/2016 | Chlapik | B01J 8/067 |

* cited by examiner

BIOGAS UPGRADING TECHNOLOGY FOR POWER GENERATION

CROSS-REFERENCE TO RELATED APPLICATIONS

This application claims the benefit of U.S. provisional application Ser. No. 62/491,413 filed Apr. 28, 2017, the disclosure of which is hereby incorporated in its entirety by reference herein.

TECHNICAL FIELD

In at least one aspect, the present invention is related to methods and systems for reforming biogas.

BACKGROUND

Lean, premixed fuel-gas combustion has been receiving increased attention recently because of its ability to reduce emissions of nitrogen oxides ($NO_X$). The reason for the reduction in emissions is because under lean-burn conditions peak flame temperatures are reduced, and the thermal $NO_X$ formation rate decreases because it is strongly temperature dependent[1-4] and, also, because for a fixed fuel energy input the overall combustor volume flow rate increases, which reduces the residence time available for $NO_X$ formation.[5] Using a mixture that is highly fuel-lean, on the other hand, may result, potentially, in incomplete/unstable combustion, which may then increase the concentration of carbon monoxide (CO) and unburned hydrocarbons (UHC) in the exhaust gas. It will also reduce the engine energy efficiency. Maintaining good combustion stability in highly fuel-lean, premixed gas combustion is, therefore, a challenging technical task. A number of studies, in recent years,[6] including the work performed by this team,[3,4] have reported that addition of hydrogen ($H_2$) to the fuel mixture can enhance combustion stability, thus allowing the mixture to burn leaner and as a result reduce the emissions of $NO_X$. However, the economics of hydrogen production and utilization during power generation remains a key challenge.

The most common approach to produce a hydrogen-rich syngas feedstock, that could potentially be used to enhance fuel-lean combustion, is via the catalytic steam reforming of methane ($CH_4$), the key component of natural gas (NG), described, typically, by the following two independent reactions (reaction R2 is also known as the water-gas shift step):

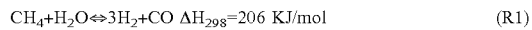

$$CH_4 + H_2O \Leftrightarrow 3H_2 + CO \quad \Delta H_{298} = 206 \text{ KJ/mol} \quad (R1)$$

$$CO + H_2O \Leftrightarrow H_2 + CO_2 \quad \Delta H_{298} = -41 \text{ KJ/mol} \quad (R2)$$

Ni-based supported catalysts are commonly utilized; however, in recent years more costly noble metal type catalysts have also found use' because of their enhanced activity and stability. Such catalysts are of particular value when reforming gas mixtures, like biogas, containing large fractions of $CO_2$, as is the case in this study. A key challenge with catalytic steam reforming is that it is an energy-intensive process.[3,8] One way to improve the energetics (and the economics) of the process is to improve conversion efficiency by employing various novel reactive separation technologies (e.g., membrane reactors or adsorptive reactors) that help to overcome the thermodynamic constraints of the reforming reactions. Increased conversion and $H_2$ yield are among the reported benefits of using such processes, which, however, are still at an early developmental stage.[9,10] Other potential methods to produce $H_2$ for use during power generation include electrolysis, which has been extensively developed in recent years and direct photocatalytic or thermochemical water splitting, the latter processes being still under development. However, the economics of these approaches are not competitive, at present, with conventional steam reforming. Gasification of waste biomass is currently being studied by a number of groups, including this team,[11] as a method to improve the economics of $H_2$ production by utilizing what is, in principle, a zero-cost renewable resource. Though progress has been made, the process is still hampered by high capital and operational costs.[12,13]

Another means to improve the energetics of hydrogen production during power generation is via the employment of combined heat and power (CHP) advanced cycle concepts that center around the idea of waste heat recovery in the engine exhaust. An interesting such concept, known as the chemical recuperation (CR) cycle, which is the focus of this application was first proposed in the late 1990s[14-16] and has been studied since. It involves the use of "waste heat" from the combustor exhaust to produce from NG, via catalytic reforming, a $H_2$-rich syngas (SG) mixture (containing, in addition, CO, $CO_2$ and unreacted $CH_4$) which is then used for power generation. In past (mostly bench-scale) investigations, the application of the CR concept to NG combustion has shown promise for attaining ultralow $NO_X$ emission levels, reduced CO emissions, and significant improvements in operability.

The prior art does not appear to disclose power generation of the CR cycle from biogas, particularly power generation with low-BTU content gas. Such gas contains, besides $CH_4$, substantial quantities of $CO_2$ and $N_2$ and numerous trace impurities known as non-methane organic compounds (NMOC), which contain heteroatoms like sulfur, silicon (siloxanes), and various halides. Catalytic reforming of $CH_4$ in the presence of substantial quantities of $CO_2$ (as in biogas) is also known as "dry reforming" and presents unique challenges to catalyst and reactor design. The NMOC are a significant hurdle as well, as they are a potential threat to catalyst performance. Ni-based reforming catalysts are the common industrial choice because of their good activity and relatively low cost, when compared to noble metal-based catalysts.[19,20] Much research has been performed on Ni-based catalysts, and their reaction mechanism and phenomena like catalyst deactivation due to coking and poisoning by sulfur impurities are well understood.[21-26] Dry-reforming of $CH_4$ is quite challenging, however, for Ni-based catalysts. Li and co-workers,[23] for example, have found a higher propensity toward coke formation. Ni-based catalysts are, nevertheless, able to function in that environment by appropriately adjusting the ($H_2O/CH_4$) feed ratio or the temperature of operation; however, noble metal catalysts are better suited to function in such an environment, particularly one that also contains small, albeit finite, concentrations of $O_2$, and have, as a result, been used in this investigation.

The combustion of NG and SG mixtures has received attention, particularly in recent years, with the advancement of the integrated gas combined cycle (IGCC) concept for the production of electricity from biomass and coal.[27-29] In one of the earliest studies, this team[3,4,30] in fundamental studies in a single jet-wall configuration reported that adding $H_2$ or CO individually to $CH_4$ increased flame stability and resistance to extinction but addition of $H_2O$ and $CO_2$ had the opposite elect. (Similar observations were reported by numerous studies since.[31-49] Delattin et al.,[50,51] who studied wet and dry SG combustion in a microturbine and compared it to NG combustion, report, for example, lower blow-off limits with no noticeable changes in pollutant production.) In fuel-lean flames, for a constant ($CH_4$/air) ratio, adding $H_2$ (or CO) increases $NO_X$ emissions but adding $CO_2$ and $H_2O$ decreases $NO_X$.[4] However, during combustion of ($H_2$/$CH_4$) mixtures, when the fraction of $H_2$ in the fuel mixture increased,[3,4,30] while the total equivalence ratio ($\Phi_{tot}$) stayed constant, little change in $NO_X$ emissions was observed (this also agrees with the observations of Coppens[52] of $H_2$/$CH_4$/ air non-stretched flames stabilized on a perforated plate burner); $NO_X$ emissions, on the other hand, substantially increased (for constant fraction of $H_2$ in the fuel) as $\Phi_{tot}$ increased. For ($H_2$/$CH_4$) flames with the same laminar flame speed (taken as a measure of flame stability), those with a higher $H_2$ content show lower $NO_X$ emissions; for the same $H_2$ content, flames with higher flame speeds show higher $NO_X$ emissions.[3,4,30] For flames with the same maximum temperature ($T_{max}$, taken as a measure of the flame's power output), $H_2$ addition shows a small beneficial effect, particularly for flames with higher $T_{max}$.[3,4,30] (Similar observations are reported by Jeong et al.[17] who studied the combustion of biogas/hydrogen blends in a spark-ignited (SI) engine under fuel-lean conditions. They defined an efficiency per $NO_X$ emissions ratio (EPN) to describe the relationship between the generating efficiency and $NO_X$ emissions. It was shown to be maximum at a $H_2$ concentration of 15%.)

For flames with the same laminar flame speed, Ren et al.[3,4,30] reported that CO addition also has a beneficial effect (albeit smaller than that of $H_2$), but for flames with the same $T_{max}$, addition of CO increases $NO_X$. For flames with the same laminar flame speed or $T_{max}$ (less so for the latter flames), $CO_2$ addition increases $NO_X$ emissions; similar observations were made by Fackler et al.[53,54] who studied $CH_4$/$CO_2$ flames in a jet-stirred reactor (JSR) with the same combustion temperature. For flames with the same laminar flame speed, $H_2O$ addition increases $NO_X$ emissions, though not as much as $CO_2$ does. For flames with the same $T_{max}$, on the other hand, $H_2O$ addition decreases $NO_X$ emissions, the effect being even stronger than that of $H_2$. Similar observations were made by Goke et al.[55] who found that steam dilution is very effective for $NO_X$ reduction in NG/$H_2$ flames and for preventing flashback and by Lee et al.,[56] who studied the combustion performance in a turbine of SG composed of $H_2$/CO/$N_2$/$CO_2$/steam and reported that $NO_X$ emissions per unit power generated decreased as the amount of SG diluents increased.

By keeping the initial ($CH_4$/air) ratio ($\Phi_{in}$) constant and then assuming that a fraction R1 of the $CH_4$ is directed to a catalytic reformer with the reformate mixture (including unreacted $CH_4$ and $H_2O$) exiting the reactor being blended back with the unreacted (1-R1) $CH_4$ fraction, Ren et al.[3,4,30] observed lower $NO_X$ emissions for sufficiently high R1 (though for a fixed incomplete reactor conversion, for real high R1, flame stability begins to suffer—this can be remedied, however, by removing the unreacted $H_2O$). For flames with the same laminar flame speed or $T_{max}$ and various R1, increasing the R1 results in decreased $NO_X$ emissions. Ren et al.[3,4,30] investigated the mechanistic causes of the observed behavior for flames with the same $T_{max}$. They reported that the impact of $H_2$ addition for such flames can be explained by a reduction of NO formation by the prompt mechanism, which agrees also with subsequent observations by others.[57,58] The impact of CO (increase in $NO_X$) can be attributed to an increase in $NO_X$ formation through the $N_2O$ mechanism. For $CO_2$ addition, since richer flames are needed to maintain the same $T_{max}$, this results in an increase in the prompt mechanism. For $H_2O$ addition, though richer flames are required and thus the rate of the prompt mechanism is higher, the rates of the thermal (Zeldovich) and $N_2O$ mechanisms are lower because the lower concentration of oxygen radicals, which are consumed by the $H_2O$+O→2OH reaction; similar observations were since reported by Giles.[58] (For further discussion about the mechanistic causes of $NO_X$ formation during combustion of SG/biogas mixtures, see ref 59.)

Alavandi and Agrawal[60] studied experimentally an equimolar mixture (CO/$H_2$), in which $CH_4$ was blended, in a two-zone porous burner. For the same adiabatic temperature, increasing the ($H_2$/CO) content in the fuel lowered the CO and $NO_X$ emissions. Arrieta and Amell[61] studied mixtures of $CH_4$ with simulated SG from coal/biomass gasification in a porous burner under fuel-lean conditions. For the same air/fuel ratio and thermal input, mixing the SG into the $CH_4$ resulted in lower CO but higher $NO_X$ emissions. Arroyo et al.[62,63] studied the combustion of SG with compositions relevant to biogas reforming in a SI engine. SG with the highest $H_2$ content resulted in the highest $NO_X$ emissions. Azimov et al.[64] in their engine study of SG combustion reached similar conclusions: Increased $H_2$ content led to higher combustion temperatures and efficiency and lower CO and HC but higher $NO_X$ emissions. Increased $CO_2$ content influenced performance and emissions only when it reached a certain level, with thermal efficiency, and $NO_X$ emissions decreasing only with $CO_2$ content past that level. In a numerical study of premixed $CH_4$/CO/air flames under fuel-lean conditions, when maintaining the $\Phi_{tot}$ constant while adding CO to the fuel, Chen et al.[65] noted a remarkable reduction in $NO_X$ emissions. When studying the combustion of $H_2$—CO mixtures blended with $CO_2$ in a SI engine under fuel-lean conditions, Chen et al.[66] reported that $CO_2$ dilution resulted in a remarkable decrease in $NO_X$ emissions with little decrease in brake thermal efficiency.

In their study of $H_2$/CO/$CH_4$/air opposed-jet flames, Cheng et al.[67] report that $H_2$ addition increases the laminar flame speed, as have also numerous other investigators.[36,40,68-79] This is mainly due to the high reactivity of $H_2$ leading to a high production rate of H and OH radicals.[80-83] Das et al.[84] experimentally studied the effect of $H_2O$ on the laminar flame speeds of moist $H_2$/CO/air mixtures using the counter flow twin-flame configuration under fuel-lean conditions. They report that the laminar flame speed varies nonmonotonically for CO-rich mixtures, first increasing, reaching a maximum value, and then decreasing with $H_2O$ addition (similar nonmonotonic impact was also recently reported by others[85,86]). In contrast, for $H_2$-rich mixtures, the laminar flame speed monotonically decreases with increasing $H_2O$ addition (with similar behavior also reported by Singh et al.[85]). The effect of CO content on the laminar burning velocity of SG was studied by He et al.,[87] who reported it to increase monotonically with it. Hinton and Stone[88] report that addition of $CO_2$ to $CH_4$ decreases the laminar burning velocity of such mixtures, with similar observations reported by numerous other investigators[77,78,89-92] attributed to the active participation of $CO_2$ in the chemical reactions through the intermediate step CO+OH↔$CO_2$+H.[93]

In summary, several prior (mostly lab-scale) studies have reported enhanced combustion stability and, in some instances, improved pollutant emissions when employing reformate products during NG combustion. However, it should be appreciated that the operation of a practical device (i.e., an internal combustion (IC) engine) operating on a mixture of real biogas and reformate products is has not been realized.

Accordingly, there is a need for improved methods of processing biogas in useful energy efficient applications.

SUMMARY

In at least one aspect, the present invention provides method of power generation from biogas, produced by the anaerobic digestion of organic waste materials in landfills or in digesters. Such biogas, typically, contains $CH_4$ diluted with $CO_2$, $N_2$, and smaller concentrations of $O_2$ and shows promise for use as a renewable fuel, in place of NG, to produce electricity. In California, for example, the law mandates that by the year 2020 one-third of the state's electricity must be from renewable sources, and 50% by the year 2030, and as a result, biogas-based power generation is attracting renewed attention. Because of concerns with $NO_X$ emissions, lean-fuel air combustion is also employed when using biogas as fuel. As noted in the case for NG, lean-burn combustion conditions result in relatively low flame temperatures that do not favor $NO_X$ formation but lead, on the other hand, to poor combustion stability and reduced engine power output. The problem is exacerbated for biogas, as it contains diluents like $CO_2$ and $N_2$ that negatively impact combustion stability. The addition of $H_2$ with its potentially favorable impact on flame stability shows, therefore, good promise for application in "biogas-to-energy" processes.[17, 18] Hydrogen production/utilization during power generation from biogas via the CR cycle is, therefore, a key focus of embodiments of the invention. In particular, embodiments use low-BTU content biogas which is a cheap (effectively zero-value, as it is today mostly being flared) and readily available renewable fuel. Advantageously, the energetic content is enhanced, thus making it possible to generate electricity from it in an energy-efficient manner.

In another aspect, a method for operating an internal combustion engine or other device (e.g., turbine or microturbine) powered by combustion is provided. The method includes a step of feeding a first stream of biogas to a catalytic reforming reactor in which the first stream contacts (e.g., reacts with) oxygen to form a first product stream comprising synthesis gas. The oxygen can be derived from water, CO, and/or molecular oxygen (i.e., $O_2$). The first product stream is combined with a second stream of biogas to form a second product stream. The second product stream is provided to a device powered by combustion. A system implementing the method is also provided. In a refinement, the device powered by combustion is an electric generator.

In another aspect, reforming products during biogas combustion are used in a lean-burn gas engine in order to reduce $NO_X$ emissions and to enhance combustion stability.

DETAILED DESCRIPTION

Figure 1A:
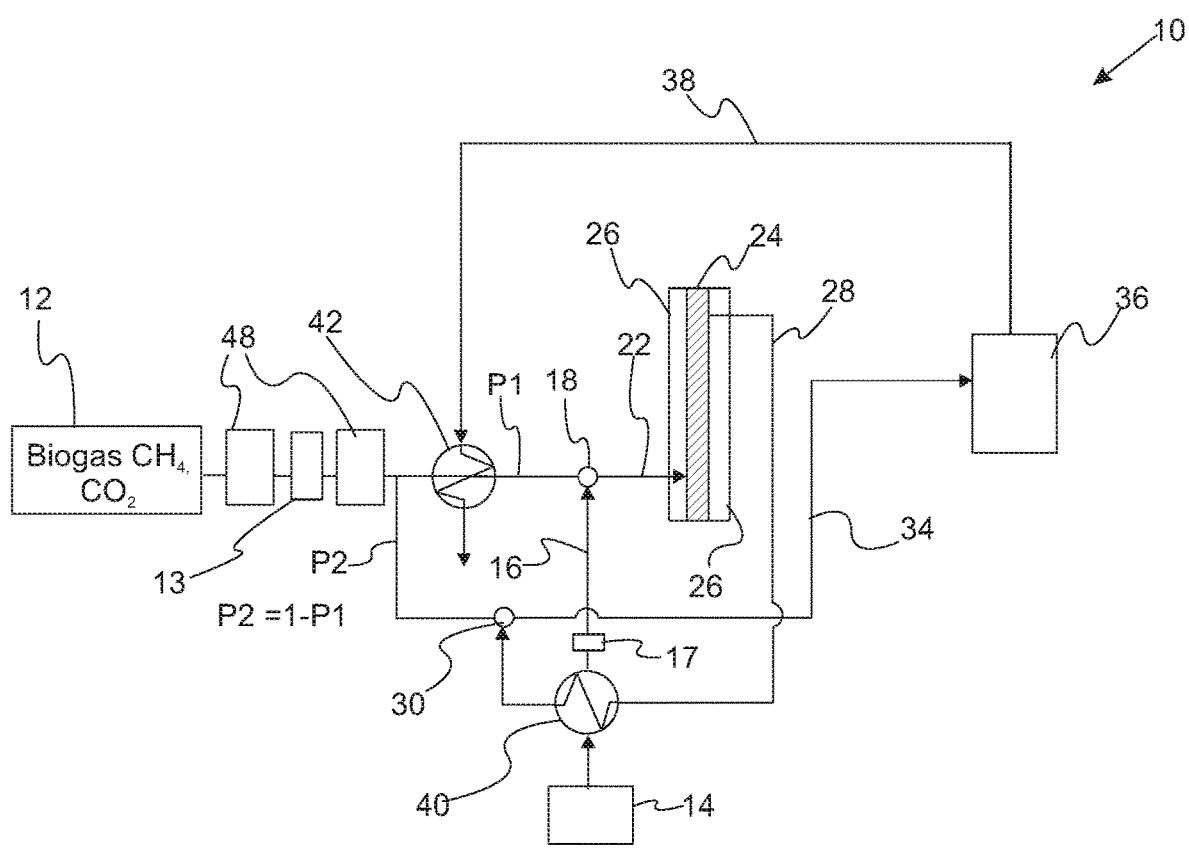
FIG. 1A. Schematic of a biogas reforming system.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention, and it is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

ABBREVIATIONS

"CR" means chemical recuperation.
"LFG" means landfill gas.
"NG" means natural gas.
"NMOC" means non-methane organic compounds.
"PBR" means packed-bed reactor.

The term "biogas" means gases produced by the breakdown of organic matter in the absence of oxygen.

The term "eggshell catalyst" refers to supported catalysts in which the active component or precursor thereof is provided principally as a thin outer layer on the surface of the support.

The term "air-to-fuel equivalence ratio" means the ratio of the actual fuel/air ratio to the stoichiometric fuel/air ratio.

In general, embodiments of the invention provide methods for powering an internal combustion engine or other device powered by combustion that includes a step of feeding a first stream of biogas to a catalytic reforming reactor in which the first stream contacts (e.g., reacts with) oxygen to form a first product stream comprising synthesis gas. The oxygen can be derived from water, CO, and/or molecular oxygen (i.e., $O_2$). The first product stream is combined with a second stream of biogas to form a second product stream. The second product stream is provided to a device powered by combustion. A system implementing the method is also provided. In a refinement, the device powered by combustion is an electric generator.

In an embodiment, a system and method that is fueled by biogas is provided. Advantageously, the system uses the method set forth above. With reference to FIG. 1A, biogas operating system 10 includes biogas source 12 which provides a first stream P1 of biogas and a second stream P2 of biogas. Typically, system 10 includes a compressor 13 for moving the biogas. In a refinement, first stream P1 of biogas and second stream P2 of biogas each independently consist of biogas (i.e., a stream consisting of gases produced by the breakdown of organic matter in the absence of oxygen). In another refinement, first stream P1 of biogas and second stream P2 of biogas each independently include biogas and a diluent (e.g., $N_2$, air, $CO_2$, etc.)

System 10 also includes oxygen source 14 which provides an oxygen-containing stream 16 containing an oxygen-containing compound. The oxygen containing compound can be water, CO, and/or molecular oxygen (i.e., $O_2$). In particular, oxygen-containing stream 16 is a steam stream or includes steam. When steam is used, system 10 can include boilers 17 (with heaters therein) for producing the steam. In a refinement, the weight ratio of steam to methane is from about 1 to 5. In another refinement, the weight ratio of steam to methane is from about 1.2 to 3. First stream P1 is combined with oxygen-containing stream 16 at combiner 18. Combiner 18 can be a mixing tank with separate inputs for biogas stream 14 and oxygen-containing stream 16 or simply a multiport connector. Combined stream 22 exits from combiner 18 and is fed to catalytic reforming reactor 24 in which the first stream reacts with oxygen in an oxygen-containing compound to form a first product stream 28 which includes synthesis gas. Catalytic reforming reactor 24 includes heaters 26 which can surround the reactor. Typically, the combined stream 22 is preheated to a temperature of about 550° C. to about 850° C. before entering catalytic reforming reactor 24 through the action of boiler 17 and option heat exchangers (see below). Heater 26 maintains the temperature during the reaction such that first product stream 28 exiting the reformer is at temperature from about 550° C. to about 950° C. Although the present embodiment can be sized to handling virtually any amount of flow, a useful flow range is from 0.5 to 50 SCFM. In a refinement, catalytic reforming reactor 24 is operated at pressures from about 5 to 25 psig. First product stream 28 is combined with second stream P2 at combiner 30 to produce a second product stream 34. The second product stream 34 is provided to an internal combustion engine or other device powered by combustion (collectively indicated by item number 36). In a refinement, the internal combustion engine or other device powered by combustion is operated under lean-burn conditions. In particular, the internal combustion engine or other device powered by combustion is operated under lean-burn conditions with an air-to-fuel equivalence ratio greater than 1. In a refinement, the internal combustion engine or other device powered by combustion is operated under lean-burn conditions with an air-to-fuel equivalence ratio from 1 to about 5. In a refinement, the internal combustion engine or other device powered by combustion is operated under lean-burn conditions with an air-to-fuel equivalence ratio from 1.1 to about 3.

In a variation, several opportunities for heat recuperation are provided by system 10. Sources of heat include the internal combustion engine (e.g., the exhaust thereof) and energy content of the products of the reformer. Heat recovery sinks can include heating the fuel gas stream P1 and the oxygen stream 16. For example, heat can be transferred from the internal combustion engine to the catalytic reforming reactor. In a refinement, system 10 can include heat exchanger 40 which allows exchange of heat between first product stream 28 and oxygen-containing stream 16. Similarly, system 10 can include heat exchanger 42 which allows exchange of heat between flue gas stream 38 and first stream P1 of biogas. In certain variations, additional heat exchangers will be required.

In some variations, system 10 includes purification system 48 to remove certain contaminants from the biogas streams. These contaminants include NMOC, including siloxanes and sulfur-containing inorganic compounds (primarily $H_2S$). Purification system 48 can includes one or more upstream and/or downstream of the compressors. For example, adsorbing columns upstream of the compressor can use DARCO activated carbon (AC) to remove $H_2S$ and silica gel (SiG) to remove water vapor before the gas was fed into the compressor. Adsorbing columns downstream of the compressor, can also include AC and SiG to remove the remaining contaminants as well as any condensed water after the gas was cooled. In a variation, Purification system 48 utilized the catalytic oxidation system and method set forth in U.S. Pat. No. 9,700,747; the entire disclosure of which is hereby incorporated by reference.

Characteristically, catalytic reforming reactor 24 includes a catalyst. In one refinement, the catalyst includes a metal such as nickel. In a catalyst that includes a noble metal (e.g., gold, silver, or platinum). In another refinement, the catalyst that includes a platinum group metal (e.g., platinum, ruthenium or palladium) and/or alloy thereof. In some variation, egg-shell"-type catalysts or supported catalyst of the metals set forth above can be used.

Figure 1B:
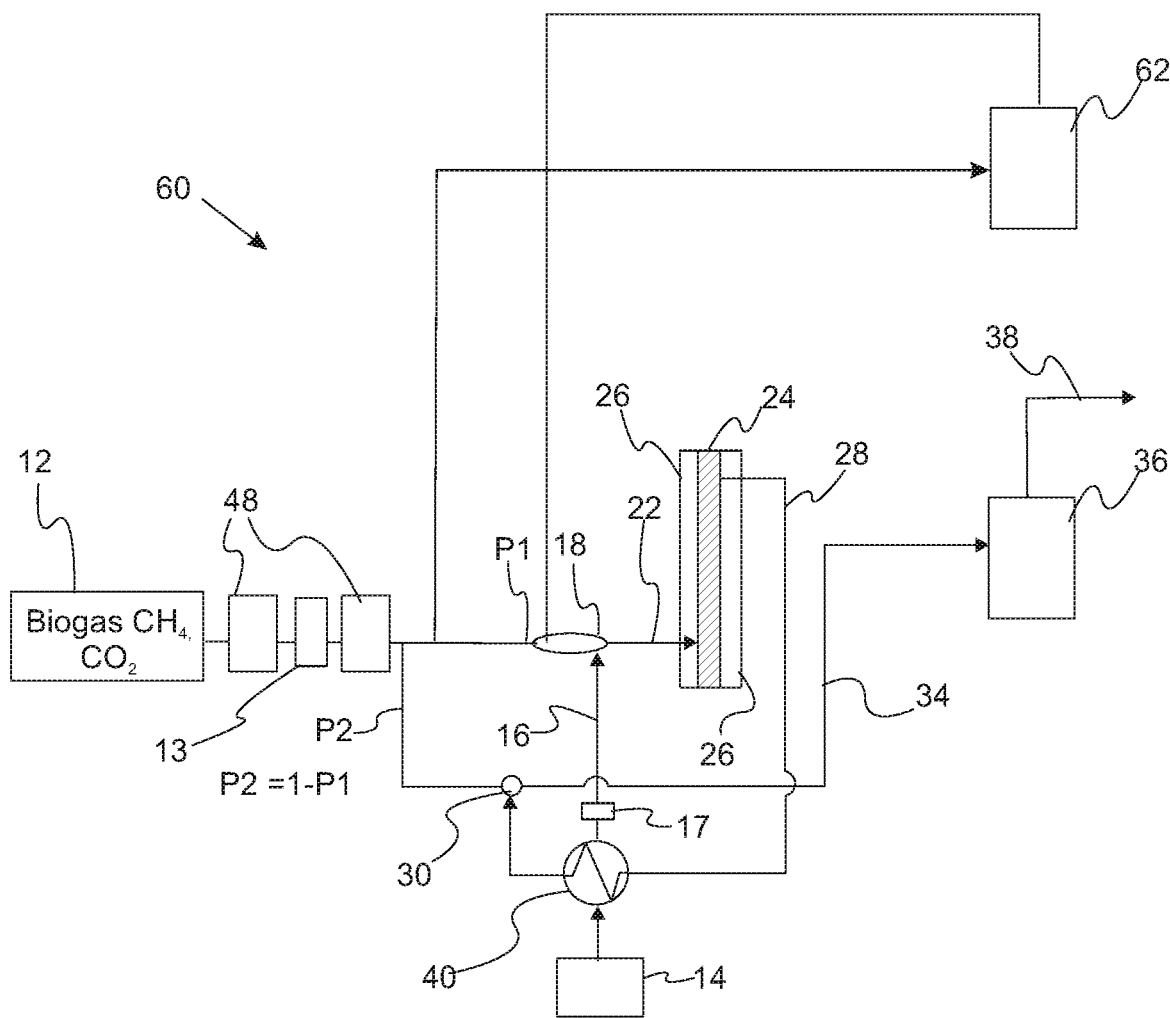
FIG. 1B. Schematic of a biogas reforming system having two engines.

In another embodiment, a system having two internal combustion engines to implement the heat recuperation step is provided. With reference to FIG. 1B, system 60 includes the rich-burn engine 62 and lean-burn engine 36 both of which operate on biogas. As set forth above, system 60 includes biogas source 12 which provides a first stream P1 of biogas and a second stream P2 of biogas. Typically, system 10 includes a compressor 13 for moving the biogas. In a refinement, first stream P1 of biogas and second stream P2 of biogas each independently consist of biogas (i.e., a stream consisting of gases produced by the breakdown of organic matter in the absence of oxygen). In another refinement, first stream P1 of biogas and second stream P2 of biogas each independently include biogas and a diluent (e.g., $N_2$, air, $CO_2$, etc.). System 60 also includes an oxygen source 14 that provides an oxygen-containing stream 16 that includes an oxygen-containing compound. In this configuration, the flue gas from the rich-burn engine 62 is mixed via first combiner 18 with the P1 portion of the biogas used for the lean-burn engine 36 and oxygen-containing stream 16 prior to feeding it into the reforming reactor 24 to form combined stream 22 which can include syntheses gas. The remaining portion of the biogas P2 together with the synthesis gas product of the reforming reaction are mixed at combiner 30 to form second product stream 34 which is then used for power generation in the lean-burn engine 36. In that case, the rich burn engine exhaust's energy is directly recuperated by mixing it with the biogas, thus not requiring the use of heat exchangers, and not incurring the unavoidable heat losses. As set forth above, system 60 can also include purification system 48. The details regarding the components and gas streams described above for FIG. 1A apply to system 60 when present. In a refinement, rich burn engine 62 be used for power generation.

Figure 1C:
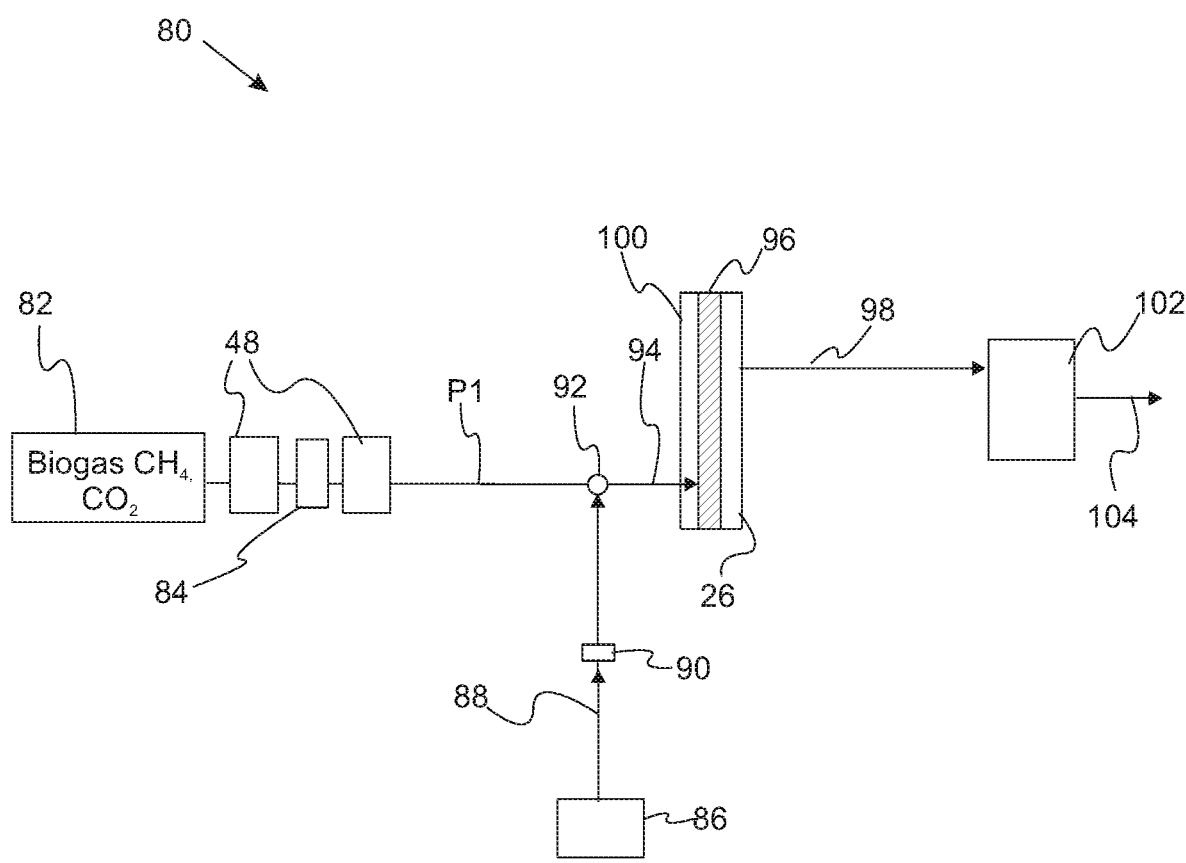
FIG. 1C. Schematic of a biogas reforming system for producing hydrogen-containing fuel.

In another embodiment, a system for producing molecular hydrogen ($H_2$) for fuel application is provided. With reference to FIG. 1C, system 80 includes biogas source 82 which provides a first stream P1 of biogas. Typically, system 80 includes a compressor 84 for moving the biogas. In a refinement, first stream P1 of biogas consists of biogas (i.e., a stream consisting of gases produced by the breakdown of organic matter in the absence of oxygen). In another refinement, first stream P1 of biogas include biogas and a diluent (e.g., $N_2$, air, $CO_2$, etc.) System 80 also includes oxygen source 86 which provides an oxygen-containing stream 88 containing an oxygen-containing compound. The oxygen containing compound can be water, CO, and/or molecular oxygen (i.e., $O_2$). In particular, oxygen-containing stream 88 is a steam stream or includes steam. When steam is used, system 80 can include boilers 90 for producing the steam. In a refinement, the weight ratio of steam to methane is from about 1 to 5. In another refinement, the weight ratio of steam to methane is from about 1.2 to 3. First stream P1 is combined with oxygen-containing stream 88 at combiner 92. As set forth above, combiner 92 can be a mixing tank with separate inputs for biogas stream P1 and oxygen-containing stream 88 or simply a multiport connector. Combined stream 94 exits from combiner 92 and is feed to catalytic reforming reactor 96 in which the first stream reacts with oxygen in the oxygen-containing compound to form a product stream 98 which includes synthesis gas. Catalytic reforming reactor 24 includes heaters 100 which can surround the reactor. Typically, the combined stream is preheated to a temperature of about 200° C. to about 300° C. before entering catalytic reforming reactor 96. Although the present embodiment can be sized to handling virtually any amount of flow, a useful flow range is from 2 to 50 SCFM. In a refinement, catalytic reforming reactor 24 is operated at pressures from about 5 to 25 psig. Product stream 98 is provided to purification system 102 to purify and remove containments to produce a $H_2$ rich output stream 104. Typically, purification system 102 includes adsorption columns and/or membranes to remove the stream components other than $H_2$. Or alternately membrane systems employing hydrogen selective membranes (e.g., Pd, Pd-alloy, carbon molecular sieve, etc.) can be used for purification. As set forth above, a portion or all of $H_2$ rich output stream 104 can be used to power a device powered by combustion.

Additional details of the methods and systems set forth herein are found in Sasan Dabir, Mingyuan Cao, Richard Prosser, and Theodore Tsotsis, *Feasibility Study of Biogas Reforming To Improve Energy Efficiency and To Reduce Nitrogen Oxide Emissions*, Ind. Eng. Chem. Res. 2017, 56, 1186-1200 including its supplementary materials; the entire disclosures of which are hereby incorporated by reference.

The following examples illustrate the various embodiments of the present invention. Those skilled in the art will recognize many variations that are within the spirit of the present invention and scope of the claims.

Experimental Section

The experimental study took place in its entirety at a field site, specifically at the Santiago Canyon landfill in Southern California. The experimental system design was based on the CR concept previously outlined. There are a number of different CR process configurations one could potentially employ to implement the proposed technology. In this "proof of-concept" effort, attention was focused on the most straightforward of such processes, shown in FIG. 1. In this process, a portion P1 of the biogas available for power generation (P1=biogas used for reforming/total biogas) is fed into the catalytic reforming reactor in order to generate the synthesis gas (the hydrogen-rich product mixture of reactions R1 and R2). In this approach, heat recuperation takes place via a conventional heat exchanger step, and only biogas (plus steam) is fed into the reforming reactor. The synthesis gas produced is mixed with the rest of the biogas (1-P1) in order to serve as the fuel for the engine.

A variation of the power generation system (FIG. 1A) provides for plentiful opportunities for waste heat recuperation. During the field testing, for example, the waste heat in the engine exhaust was used to preheat the biogas prior to flowing it into the catalytic reformer to promote the catalytic reaction, as well as to heat the water in the boiler to produce steam that is used as a reactant in the steam reforming reactions. The energy content of the products of the reformer was another source of waste heat utilized to boil the water to produce steam. It should be noted, however, that it was not the objective of this early-phase study to maximize/optimize waste heat utilization, a task that will be a key goal of a follow-up investigation.

Figure 2A:
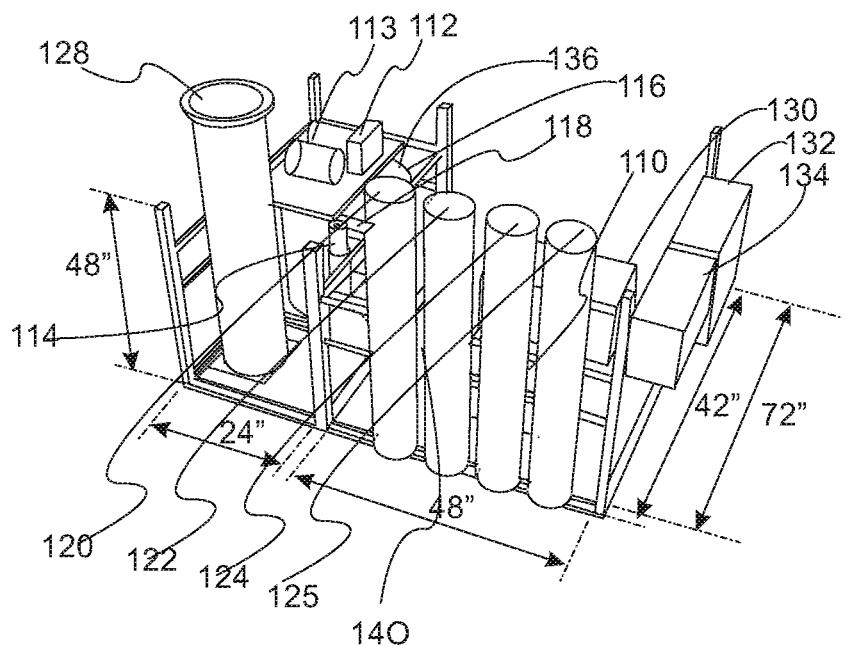
FIGS. 2A and 2B. Schematic view of the experimental setup: (A) solid view and (B) transparent view.
Figure 2B:
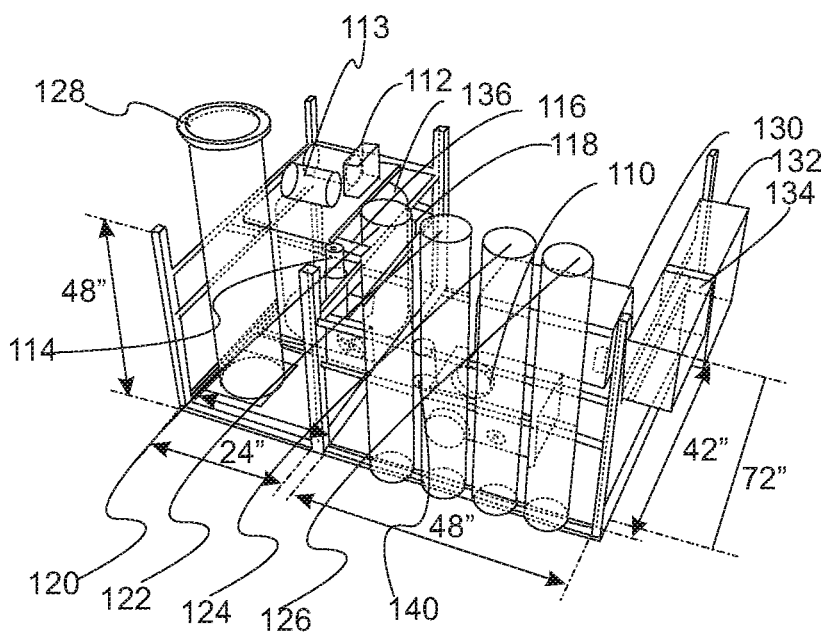

For the studies, a pilot-scale setup was constructed and installed at the Santiago Canyon landfill (see FIG. 2 for a schematic of the system). It consists of different pieces of equipment (e.g., engine 110, compressor 112, compressor drive 113, various sensors and analytical equipment, etc.) that were purchased from outside vendors and various other components (reformer 114, heat exchangers 116 and 118, boiler, etc.) that were designed and custom fabricated at the machine shop at the University of Southern California (photographs and brief descriptions of all system components can be found in the Supporting Information). Heat exchanger 116 is a first phase heat exchanger that uses exhaust gas as the hot stream and heat exchanger 118 is a second phase heat exchanger. Also depicted in FIGS. 2A and 2B are columns 120-126, 8 inch diameter steam boiler 128, Power generator 130, power panel 132, control panel 134, water tank 136, and water knockout 140. The system was sized for a maximum flow of ~5 standard cubic meters per hour (SCMH) (3 SCFM) of landfill gas (LFG), with the reformer operating in the pressure range of 1.36-1.70 bar (5-10 psig), with a maximum boiler pressure of ~2 bar (15 psig). There is no "biogas-to-energy" system presently installed at the Santiago Canyon landfill, so the biogas that is produced there is collected and then combusted via the use of three flares, fed by blowers that delivers the LFG. To provide the biogas to the pilot-scale setup, a line was connected to the exit pipe of one of the blowers (blower #1); the discharge pipe from the setup was connected to the flare-stack #1. The system discharge that consists of the back-pressure regulator discharge flow and outlet stream of the sensor box was recycled through a line connected to the suction point of blower #1.

The LFG at the Santiago Canyon site contains about 30% $CO_2$, 30-35% $CH_4$, and 1-2.5% $O_2$, balanced with $N_2$ and water vapor. There are also small amounts of other compounds (<1%) that include $H_2$ and NMOC, including siloxanes and trace amounts of sulfur-containing inorganic compounds (primarily $H_2S$). Before the biogas could be fed to the system, these contaminants had to be removed. For that, four adsorbing columns were used: two columns upstream of the compressor and two columns downstream. The adsorbing columns upstream of the compressor, the first containing DARCO activated carbon (AC) and the other silica gel (SiG), were used to remove the $H_2S$ and water vapor, respectively, from the LFG before the gas was fed into the compressor. The two adsorbing columns downstream of the compressor, also containing AC and SiG were used to remove the remaining contaminants as well as any condensed water after the gas was cooled.

The total flow rate of the gas, as well as of the portion of the gas going into the reformer, were measured via the use of an orifice plate and a differential pressure transducer (DPT) that measures the pressure drop across the orifice, which is then used to calculate the volumetric flow rate. The pressure of the system was regulated using a back-pressure regulator (BPR) downstream of the system where the dried reformate gas was connected to the engine. In order to provide the steam for the reformer, a boiler was used, the pressure of which was set to values between 1.7 and 1.9 bar (10-13 psig), with the maximum designed pressure being ~2 bar (15 psig); the steam flow rate into the reformer was measured using another orifice plate and a DPT. The flow rate of the steam was adjusted to the value required to provide the selected steam/methane ratio for a given experiment. After the LFG was mixed with the steam flow, the mixture entered the first-phase, cross-flow type heat exchanger in order for its temperature to be raised to 260-282.2° C. (500-540° F.) (before entering the reformer) using the exhaust gas of the 7.5 kW power generator as the heating fluid.

Once the flowing mixture was preheated to the desired temperature, it would enter the catalytic reformer, which was built from a 60.96 cm (24 in.) long stainless-steel pipe (7.62 cm (3 in.) ID, 8.89 cm (3.5 in.) OD, Schedule 40). The bottom half of the reformer was packed with two different sizes of stainless steel balls (5.6 mm (7/32 in.) and 7.9 mm (5/16 in.)) and served as the preheating section. The top-half of the reactor was packed with $Pt/Al_2O_3$ catalyst pellets (JM-R44 PGM, purchased from Johnson Matthey, Inc.) and served as the reaction zone. The properties of the catalyst, as provided by the manufacturer, are listed in Table 1.

Two K-type thermocouples were inserted in a thermowell, made from a 6.35 mm (¼ in.) stainless steel tubing inserted axially in the reactor; their tips were placed at a distance of 15.24 cm (6 in.) and 30.48 cm (12 in.) from the entrance of the reactor. One additional thermocouple was inserted from the top of the reactor, its tip placed precisely at the exit of the reactor. The reactor was heated from the outside using four high-temperature ceramic heaters, nominally 0.8 KW each, completely surrounding it. The two bottom heaters were installed in parallel and were controlled by the system control panel through a silicon-controlled rectifier (SiCR); the two top heaters, installed in parallel again, were controlled by the system control panel through another separate SiCR. The temperatures of the reformer were monitored and recorded in real time by the system control panel. The outer surface of the reformer was completely insulated using high-temperature insulation.

TABLE 1

Properties of the catalyst (JM-R44-PGM)

| | |
|---|---|
| Diameter of the pellet | 1.8 mm |
| Density | ~1 g/ml |
| Surface area of the catalyst support | ~120 m²/g |
| Thickness of the catalyst layer (coated on the surface of the alumina ($Al_2O_3$) support at 20 wt % cat/wt. pellet) | ~100 μm |

TABLE 2

Reaction Rate Expression (adapted from Schouten and coworkters[94])

| reaction | rate expression |
|---|---|
| R1: $CH_4 + H_2O \Leftrightarrow 3H_2 + CO$ | $r_1 = \dfrac{K_1 \left(P_{CH4} - P_{H_2}^3 P_{CO_2} / K_{eq,1}\right)}{P_{CH4}^{m_1} P_{H_2O}^{n_1}}$ |
| R2: $CO + H_2O \Leftrightarrow H_2 + CO_2$ | $r_2 = \dfrac{K_2 (P_{CO} - P_{H_2} P_{CO} / K_{eq,2})}{P_{CH4}^{m_2} P_{H_2O}^{n_2}}$ |
| R3: $CH_4 + 2O_2 \rightarrow CO_2 + 2H_2O$ | $r_3 = \dfrac{k_{31} P_{CH4} P_{O_2}}{\left(1 + k_{CH4}^{ad} P_{CH4} + k_{O_2}^{ad} P_{O_2}\right)^2} + \dfrac{k_{32} P_{CH4} P_{O_2}}{\left(1 + k_{CH4}^{ad} P_{CH4} + k_{O_2}^{ad} P_{O_2}\right)}$ |

[a]$m_1 = 0.0$, $n_1 = 0.596$, $m_2 = 0.0$, $n_2 = 0.0$, as obtained by Numaguchi and Kikuchi.[95]

Inside the reactor, reactions R1 and R2 take place. Because of the presence of a small fraction of oxygen in the LFG, combustion reactions of methane (R3) or of $H_2$ and CO (R4 and R5 in the Modeling section) may also take place with their heat of the reaction being recuperated by the endothermic reaction R1.

$$CH_4 + 2O_2 \rightarrow CO_2 + 2H_2O \tag{R3}$$

The reformer reaction products, after exiting the reactor, would pass through a coil inside the boiler in order to recoup their heat to produce the steam for the reformer. The gases exiting the boiler would then flow into an air-fin cooler equipped with a fan to cool the gas, mainly by removing the latent heat from the water vapor and condensing it into liquid water, which was then removed using a manual valve on the air-fin cooler as well as a water knockout system that would trap the water and drain it automatically. The gas product downstream of the air-fin cooler had an approximate temperature of 37.8° C. (100° F.). (Note that the use of the air-fin cooler was one of convenience to limit the system complexity and its capital costs; in a precommercial or commercial-scale system, this effluent could be used for additional heat recuperation, e.g., for preheating the LFG or the water going into the boiler.) Once the water was removed from the gas product through a water trap and an additional adsorbing column, the mixture, now as a fuel, would either go directly into the engine or would be blended with the bypass flow of the raw LFG first and would then be sent to the engine.

The composition of the various components was measured using a sensor block which contained five different sensors for $CH_4$, $CO_2$, $O_2$, nitrogen monoxide (NO), and nitrogen dioxide (N $O_2$). A portable analyzer was also used to measure the composition of $H_2$ in the dry gas mixture. (For more information, please refer to the Sensors and Analyzers part of the Supporting Information and Figure S5. As shown in the P&ID drawing of the system, Figure S9, the various gases were sampled using a total of four solenoid valves labeled as SOV-01, SOV-11, SOV-31, and SOV-32, from upstream of the reformer, downstream of the reformer, after the blending point, and at the exhaust of the engine, respectively.) All conversion values presented in the figures are molar-based for both the calculated equilibrium and experimental values, and are based on the feed molar flow rate of methane.

Modeling

As part of the study, the catalytic packed-bed reformer was also simulated in order to gain insight into the observed experimental behavior and to further guide the on-site biogas reforming experiments. Since the specific catalyst composition is proprietary to the catalyst manufacturer, the true experimental reaction rate expressions are not utilized in the simulations set forth below. Instead, the rates for the three chemical reactions R1, R2, and R3 shown in Table 2 from the technical literature[94] are used instead.

A pseudo-homogeneous packed-bed reactor (PBR) model is used, in which the reaction rate is expressed per unit mass of catalyst in the bed and in which diffusion inside the catalyst pellets is not explicitly accounted for. This assumption is consistent with the "egg-shell"-type catalyst used, with the active noble metal embedded in a thin skin on the top of a nonporous spherical pellet, so that one can assume that the reactions only occur on the surface of the pellet. With no additional information about the properties of the active layer or the properties of the inner solid core, the model also does not account for intraparticle temperature gradients. In addition to not explicitly accounting for the intraparticle concentration and temperature gradients, the pseudo-homogeneous model also does not explicitly account for external mass and heat transfer limitations. The gas phase reformate mixture was, for simplicity, assumed to obey the ideal gas law, which was shown, based on the calculations of compressibility factors, not to be a bad assumption given that the reformer was operating at near atmospheric pressure and high-temperature conditions.

In the PBR model, the axial dispersion of mass is neglected, as suggested by Schouten and co-workers.[94] The equation solved are detailed below. The mass balance equation for the pseudo-homogeneous PBR 1-D model is given as:

$$\frac{dF_i}{dV} = (1 - \epsilon_{bed})\rho_s R_i \tag{1}$$

where Fi (mol/s) is the molar flow rate of species i, V($m^3$) the reactor volume variable, $\epsilon_{bed}$ the void fraction of the PBR, which was measured to be equal to 0.43, $\rho_s$ the density of the catalyst (kg-cat/$m^3$), and $R_i$ the rate of reaction for species i (i=$CH_4$, CO, $H_2O$, $CO_2$, $H_2$, $O_2$, $N_2$) in the PBR (mol/kg-cat s) described by the following equation:

$$R_i = \Sigma \alpha_{ij} r_j \tag{2}$$

where $\alpha_{ij}$ is the stoichiometric coefficient of species i in reaction j (j=1, for the methane steam reforming reaction, j=2 for the water gas shift reaction, and j=3 for the $CH_4$ oxidation reaction-negative for reactants, positive for products, and 0 for inerts like $N_2$), and $r_1$ (mol/kg-cat s) is the rate of reaction j, described by the expressions in Table 1, with the partial pressure Pi (bar) for each species i described by the following equation:

$$P_i = \frac{F_i}{\sum F_i} P \tag{3}$$

where P (bar) is the total reactor pressure. The volumetric flow rate V($m^3$/s), along the axial (Z) direction, in the PBR is described as:

$$\dot{V} = \frac{R_g T}{P} \sum F_i \tag{4}$$

where $R_g$ (8.3144×$10^{-5}$ $m^3$ bar/mol K) is the gas constant, and T (K) is the reactor temperature. The superficial fluid velocity u (m/s) is defined as follows:

$$u = \frac{\dot{V}}{A_c} \tag{5}$$

where $A_c$ ($m^2$) is the reactor cross-sectional area. The pressure drop in the PBR is described by the Ergun equation as follows:[96]

$$-\frac{dP}{dV} = \frac{(1-\epsilon_{bed})G}{A_c \rho d_p \epsilon_{bed}^3}\left[150\frac{(1-\epsilon_{bed})\mu}{d_p} + 1.75G\right]$$

$$= \frac{(1-\epsilon_{bed})u}{A_c d_p \epsilon_{bed}^3}\left[150\frac{(1-\epsilon_{bed})\mu}{d_p} + 1.75G\right] \tag{6}$$

where $\rho$ is the fluid density (kg/$m^3$), $d_p$ (m) the diameter of the catalyst pellets, $\mu$ the fluid phase viscosity for gas mixture (kg/m s), and G (kg/($m^2$ s) the superficial mass velocity given by the following equation:

$$G = u\rho = u_f \rho_f \tag{7}$$

where subscript f signifies the feed conditions. The viscosity of the gas mixture $\mu_{mix}$ in eq 6 is calculated using the Wilke's equation[97]

$$\mu_{mix} = \sum_{i=1}^{n} \frac{x_i \eta_i}{x_i + \sum_{j=1}^{n} \Phi_{ij} x_j} \tag{8}$$

$$j \neq i$$

where $$\Phi_{ij} = \frac{\left[1+\left(\frac{\eta_i}{\eta_j}\right)^{0.5}\left(\frac{Mw_i}{Mw_i}\right)^{0.25}\right]^2}{\sqrt{8}\left[1+\left(\frac{Mw_i}{Mw_j}\right)\right]^{0.5}}$$

In eq 8, $x_i$ and $x_j$ are the mole fractions for species i and j, $M_{wi}$ and $M_{wj}$ are their molecular weights (g/mol), and $\eta_i$ and $\eta_j$ are the corresponding single-gas viscosities (Pa s) calculated from eq 9[98]

$$\eta = \frac{AT_r^2}{[1+0.36T_r(T_r-1)]^{1/6}} \left[\frac{1+270(\mu_r^0)^4}{T_r+270(\mu_r^0)^4}\right] \quad (6)$$

where $\eta$ is the viscosity for single gas (Pa s), $T_r$ is the reduced temperature, A is a constant determined by group contribution methods, and $\mu_r^o$ the modified reduced dipole moment which is calculated from $$\mu_r^o = 52.46\mu_r \quad (10)$$

$$\mu_r = (\mu)^2(P_c)(T_c)^{-2} \quad (11)$$

where $\mu$ is the dipole moment (debyes), Pc (bar) is the critical pressure, and Tc (K) is the critical temperature.

The heat balance equation is as follows:

$$\left(\sum_{i=1}^n F_i C_{p,i}\right)\frac{dT}{dV} = Q_V + (1-\epsilon_{bed})\rho_s \sum_{j=1}^3 (-r_j \Delta H_{T,j}) \quad (12)$$

In eq 12, $Q_V$ is the heat per unit time per unit volume (kW/m³) delivered to the reactor from the heating elements, $C_{p,I}$ (kJ/(mol K) is the specific molar heat capacity of species i, described by the following equation:

$$C_{p,i} = A_i + B_i T + C_i T^2 + D_i T^3 \quad (13)$$

where the values of the individual coefficients are taken from Elliott and Lira.[99] Here, $\Delta H_{T,j}$ (kJ/mol) is the heat of reaction j described by the following equation:

$$\Delta H_{T,j} = \Delta H_{R,j}^{298.16} + \int_{298.16}^T \Delta C_{p,j} dT \quad (14)$$

where $\Delta H_{R,j}^{298.16}$ (kJ/mol) is the standard heat of reaction at reference conditions (298.16 K) and $\Delta C_{pj}$ is described by:

$$\Delta C_{pj} = \Sigma_i \alpha_{ij} C_{p,i} \quad (15)$$

Equations 1, 6, and 12 constitute a system of (N+2) ordinary differential equations, which describe the (N+2) dependent variables (N=7 molar flow rates, $F_i$, for the seven components in the mixture flowing through the reactor plus the temperature and total pressure) as a function of the independent reactor volume variable V. Together with the following initial/boundary value conditions $$V=0; F_i = F_{i0}; P=P_F; T=T_F \quad (16)$$

eqs 1, 6, and 12 constitute an initial value problem that has been solved in MATLAB. The value of the total heat per unit time $q_v = \int_0^V Q_V dV$ added to the reactor can be back-calculated from the experimentally measured exit temperature ($T_{ex}$) and composition according to the following overall energy balance eq 17, which does not require a knowledge of reaction rate expressions (the exact $q_V$ values utilized in the simulations are indicated in the captions of the relevant figures)

$$q_v = \int_0^V Q_V dV = \int_{T_F}^{T_{ex}} \sum_{i=1}^n F_{i0} C_{pi} dT + (1-\epsilon_{bed})\rho_s \quad (17)$$

$$\sum_{j=1}^3 \Delta H_{j,T_{ex}} \int_0^V r_j dV$$

where $\Delta H_{j,Tex}$ is the heat of the reaction calculated at $T_{ex}$. The integrals of the rates in eq 17 can be calculated (based on eq 1) from the inlet $F_i I_0$ and outlet $F_i I_e$ molar flow rates of various species as follows:

$$F_{CH_4} I_0 X - \frac{F_{O_2} I_0}{2} = (1-\epsilon_{bed})\rho_s \int_0^V r_1 dV \quad (18)$$

$$F_{O_2} I_e - F_{CO_2} I_0 - \frac{F_{O_2} I_0}{2} = (1-\epsilon_{bed})\rho_s \int_0^V r_2 dV \quad (19)$$

$$F_{O_2} I_0 = 2(1-\epsilon_{bed})\rho_s \int_0^V r_3 dV \quad (20)$$

where X is the conversion of methane defined by eq 21:

$$X = \frac{F_{CH_4} I_0 - F_{CH_4} I_e}{F_{CH_4} I_0}. \quad (21)$$

The exit temperature for the preheating zone is calculated by the following overall heat balance equation:

$$\int_{T_{in}}^{T_F} (\Sigma_{i=1}^N F_i C_{pi}) dT = q_{tot} \quad (22)$$

where $T_{in}$ is the inlet temperature in the preheating zone (K), and $q_{tot}$ (W) is the heat delivered per unit time by the two ceramic heaters in the preheating zone.

Of the five overall global reactions that can potentially take place during the steam reforming of biogas, specifically reactions R1, R2, and R3, as well as the oxidation reactions R4 and R5

$$2H_2 + O_2 \Rightarrow 2H_2O \quad (R4)$$

$$2CO + O_2 \Rightarrow 2CO_2 \quad (R5)$$

only three are linearly independent. For calculating the equilibrium conversion of $CH_4$ and the corresponding equilibrium species compositions in the reactor at the measured exit temperature of $T_{ex}$, three independent reactions, R1, R2, and R3, were chosen. For the calculations, thermodynamic equilibrium constants from the technical literature[100] were utilized. Other properties used for the modeling can either be found in Table 3 or are indicated in the captions of the corresponding figures.

TABLE 3

Reactor Properties Used for Modeling

| | |
|---|---|
| Diameter of the pellet | 1.8 mm |
| Density of catalyst pellet | ~1 g/ml |
| Inside diameter of reactor | 7.62 cm (3 in.) |
| Reactor cross section area (Ac) | 0.0045604 m² |
| Length of reactor (L) | 30.48 cm (12 in.) |
| $\epsilon_{bed}$ | 0.43 |

In the past, the combustion characteristics of NG/syngas mixtures have been analyzed in the laboratory using model experimental combustion configurations.[3,4,30] The blending of syngas with NG was shown to increase combustion stability and to decrease $NO_X$ emissions, in agreement with the behavior observed with the biogas/syngas mixtures in this field study set forth above. It goes beyond the scope of the present study, however, to simulate the complex, turbulent reactive flows within the experimental test engine (a DuroMax XP4400EH dual-fuel generator, see the Supporting Information for a photograph and further technical details) utilized. Instead, the adiabatic combustion temperatures are calculated at the experimental engine feed and pressure conditions in order to compare such temperatures among the various fuels utilized. These calculations are important to provide guidance about the amount of waste heat that is being chemically recuperated and the level of potential increase in engine efficiency when using the biogas/reformate blends. The equilibrium $NO_X$ compositions are also calculated at the corresponding adiabatic combustion conditions. Under fuel-lean conditions, $NO_X$ emissions consist primarily of NO and $NO_2$, and for the calculations, the following two global reactions were chosen:

$$N_2 + O_2 \Rightarrow 2NO \qquad (R6)$$

$$2NO + O_2 \Rightarrow 2NO_2 \qquad (R7)$$

For the equilibrium calculations, the engine cylinder compression ratio, which represents the ratio of the volume of its combustion chamber from its largest capacity to its smallest capacity, was assumed to be 10, which is typical for the general-purpose gasoline/propane IC piston engines employed in this study.

As part of the present study, the technical feasibility of employing catalytic reforming to improve the energy efficiency and to reduce $NO_X$ emissions during power generation from biogas has also been evaluated. In the effort, the experimental results from field testing and the related modeling have been used in a financial and process model to access the commercial feasibility for the proposed process. The capital costs, including the cost of the reformer, heat exchangers, and engine, and fixed/variable operation and maintenance (O&M) cost were estimated for an 848 SCMH (500 SCFM) "biogas-to-energy" project, which is typical of sites producing low-BTU content LFG. The focus of efforts was to evaluate whether the proposed process is potentially financially viable for such a small size project, and the preliminary findings are summarized below, with the calculation details shown in the Supporting Information.

Results and Discussion

Reformer Performance.

Figure 3:
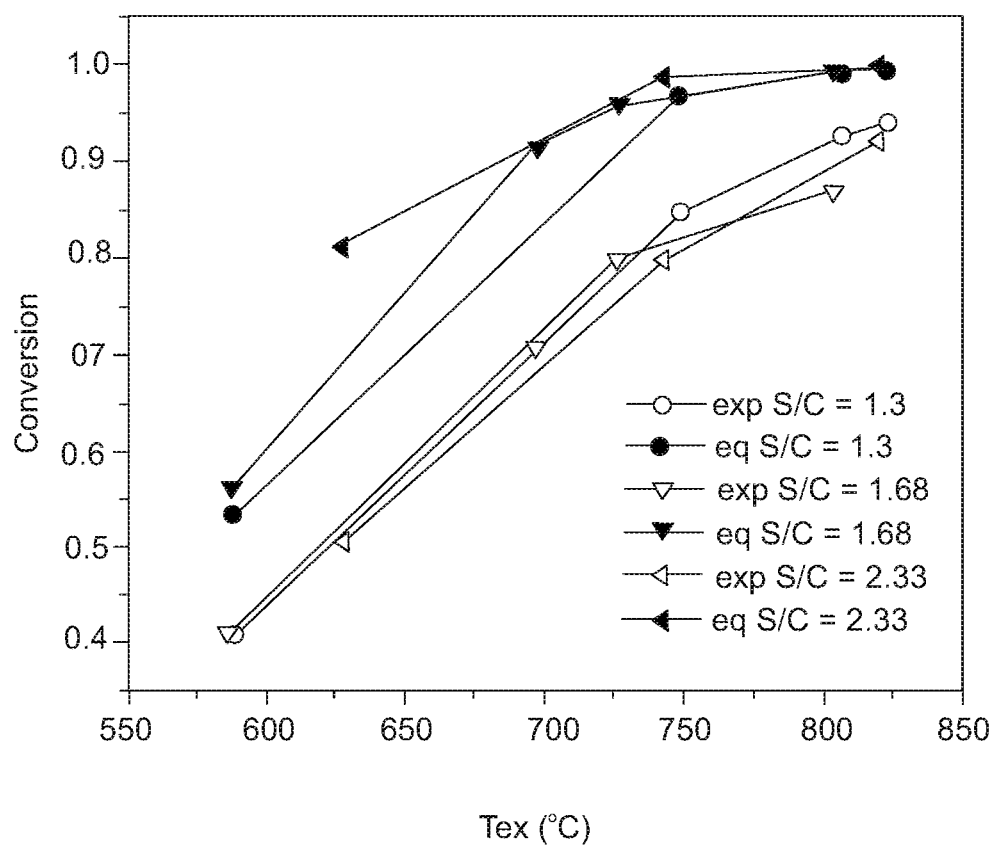
FIG. 3. Experimental conversions and calculated equilibrium conversions for different (S/C) ratios as a function of $T_{ex}$.
Figure 4A:
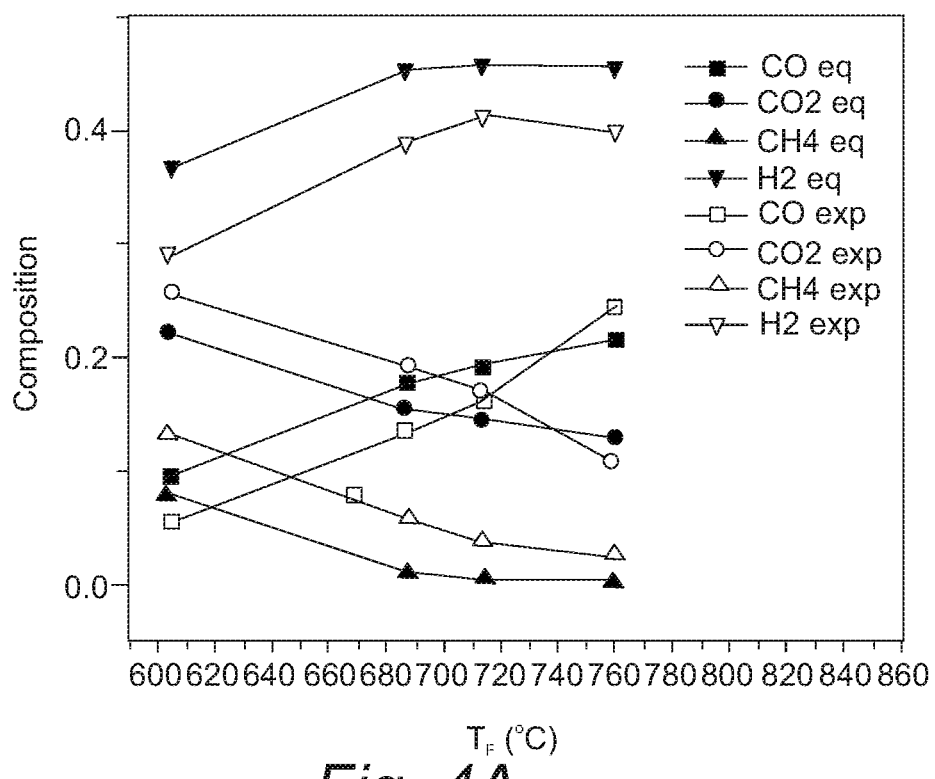
FIGS. 4A and 4B. Experimental compositions and calculated equilibrium compositions as a function of feed temperature TF for two different (S/C) ratios. A) (S/C)=1.68 and B) (S/C)=2.33. Other conditions such as feed flow rate and feed composition are listed in Sasan Dabir, Mingyuan Cao, Richard Prosser, and Theodore Tsotsis, *Feasibility Study of Biogas Reforming To Improve Energy Efficiency and To Reduce Nitrogen Oxide Emissions*, Ind. Eng. Chem. Res. 2017, 56, 1186-1200 including its supplementary materials; the entire disclosures of which are hereby incorporated by reference.
Figure 4B:
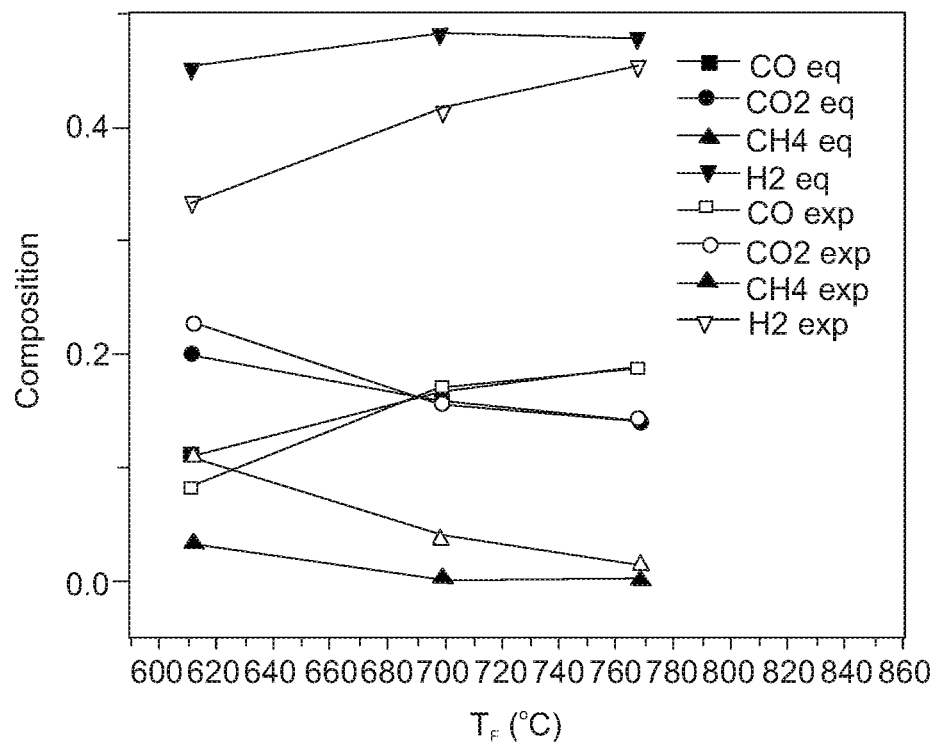

The catalytic reformer operated stably throughout the field testing, with the catalyst showing high activity and no evidence of catalytic deactivation. During the studies, the effect of control parameters, such as the steam/methane (S/C) ratio and the total flow rate of gas going into the reformer (which is determined by the reformer bypass ratio), on the performance of the biogas catalytic reforming process was quantitatively analyzed and assessed. FIG. 3 shows the experimental and the calculated equilibrium conversions for three different (S/C) ratios, plotted with respect to the measured reformer exit temperature, $T_{ex}$, for the same approximate biogas flow of ~2 SCMH (1.23 SCFM) (corresponding to a catalyst weight to biogas molar flow rate ratio of W/F=117 kg-cat s/mol) and feed pressure of 1.7 bar (10 psig). FIG. 4 shows the experimental and calculated equilibrium species compositions (molar basis as is the case for all figures in this application) plotted as a function of the feed temperature into the reaction zone. (The biogas composition at the field site was a bit variable. Specifically, for the experiments in FIGS. 3 and 4 for the (S/C) ratio of 1.3 the biogas composition was $O_2$: 2.1%, $CO_2$: 29%, $CH_4$: 30%, $N_2$: 38.9%; for the experiments with a (S/C) ratio of 1.68, it was $O_2$: 1.8%, $CO_2$: 29.8%, $CH_4$: 30.6%: and $N_2$: 37.8%, and for the experiments with a (S/C) ratio of 2.33 it was $O_2$: 1.7%, $CO_2$: 29.8%, $CH_4$: 32.2%, and $N_2$: 36.3%. In the simulations, the real experimental biogas feed composition and flow rate were utilized.)

Higher (S/C) ratios imply higher calculated equilibrium methane conversions, though the effect saturates out at the higher Tex. Higher (S/C) ratios though lead to higher equilibrium concentration of $H_2$ (on a per dry basis) in the syngas product, as the presence of steam helps to shift the equilibrium of the reactions R1 and R2 to the right, see FIG. 4. (On the other hand, higher (S/C) ratios, generally, imply higher required $q_V$ values. The estimated $q_V$ (kW) values for the data shown in FIG. 4 are 0.33-1.4 kW for the S/C=1.68 case, and 0.64-1.54 kW for the S/C=2.33 case.) The experimental behavior is a bit more "nuanced" though, as the reactor operates away from equilibrium. Under these conditions, higher (S/C) ratios imply higher reaction rates due to an increase in the concentration of reactant steam, but simultaneously the total flow (steam+biogas) of gas going through the reactor increases (for a fixed flow of biogas), which implies a decreased residence time and, thus, lower conversions.

Figure 5:
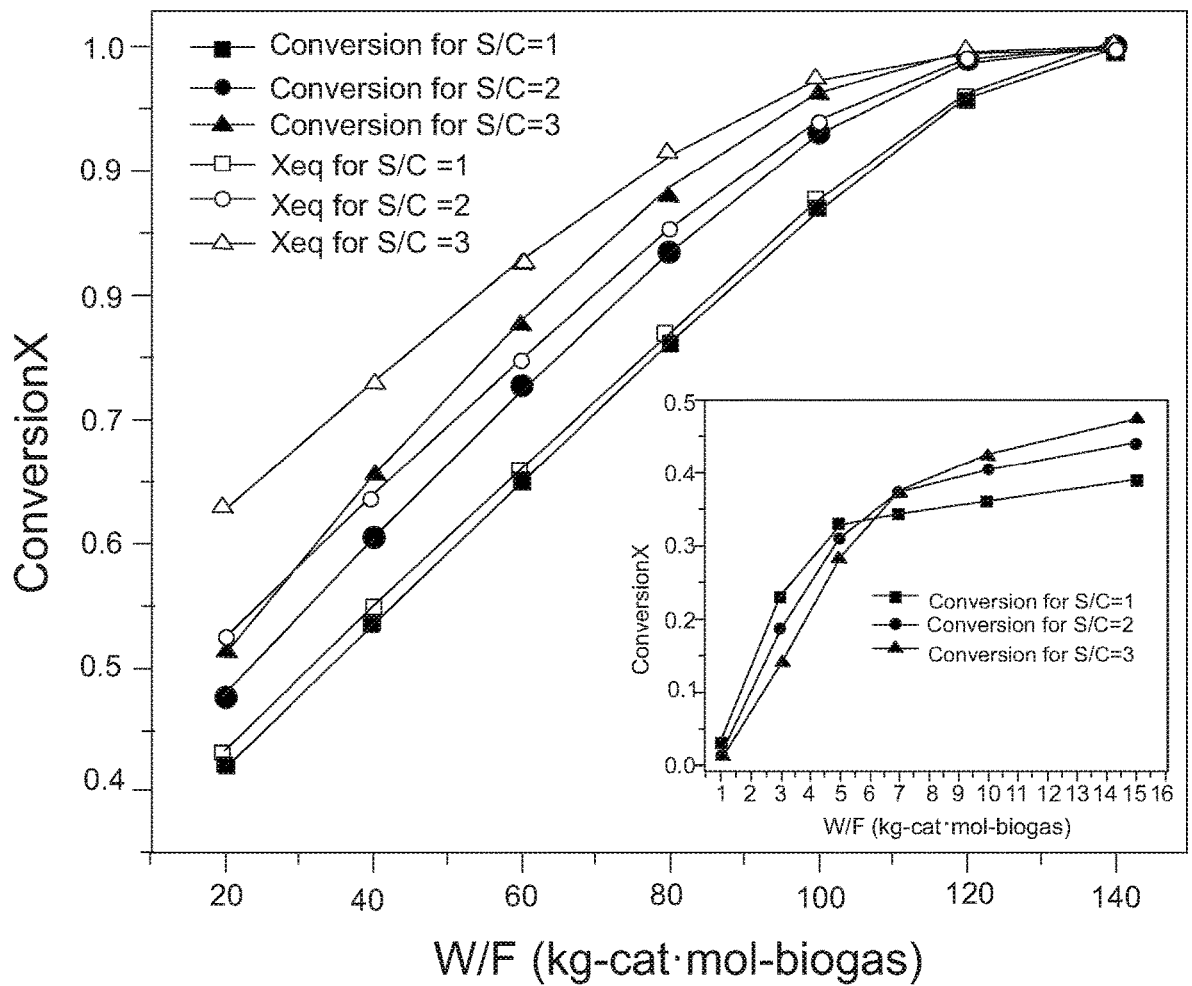
FIG. 5. Calculated conversion vs W/F for various steam to methane ratios; $q_V$=1.6 kW.
Figure 6:
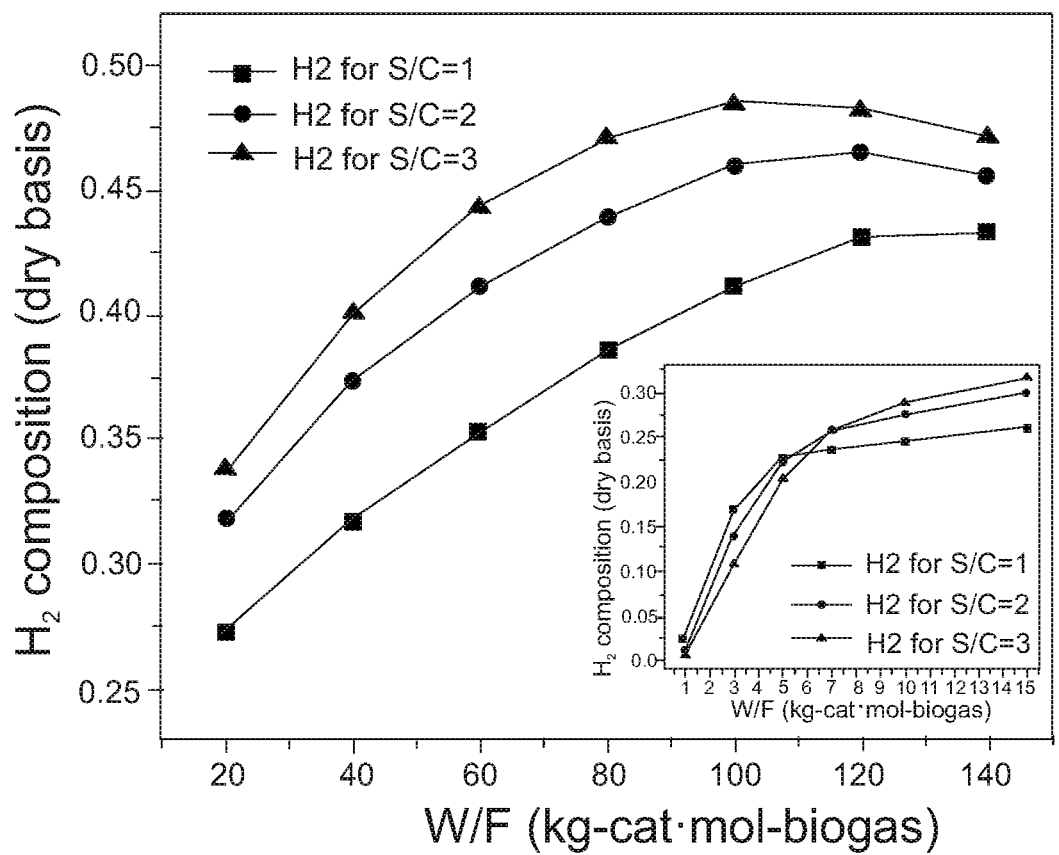
FIG. 6. Calculated $H_2$ composition (dry basis) vs W/F for various steam to methane ratios; $q_V$=1.6 kW.
Figure 7:
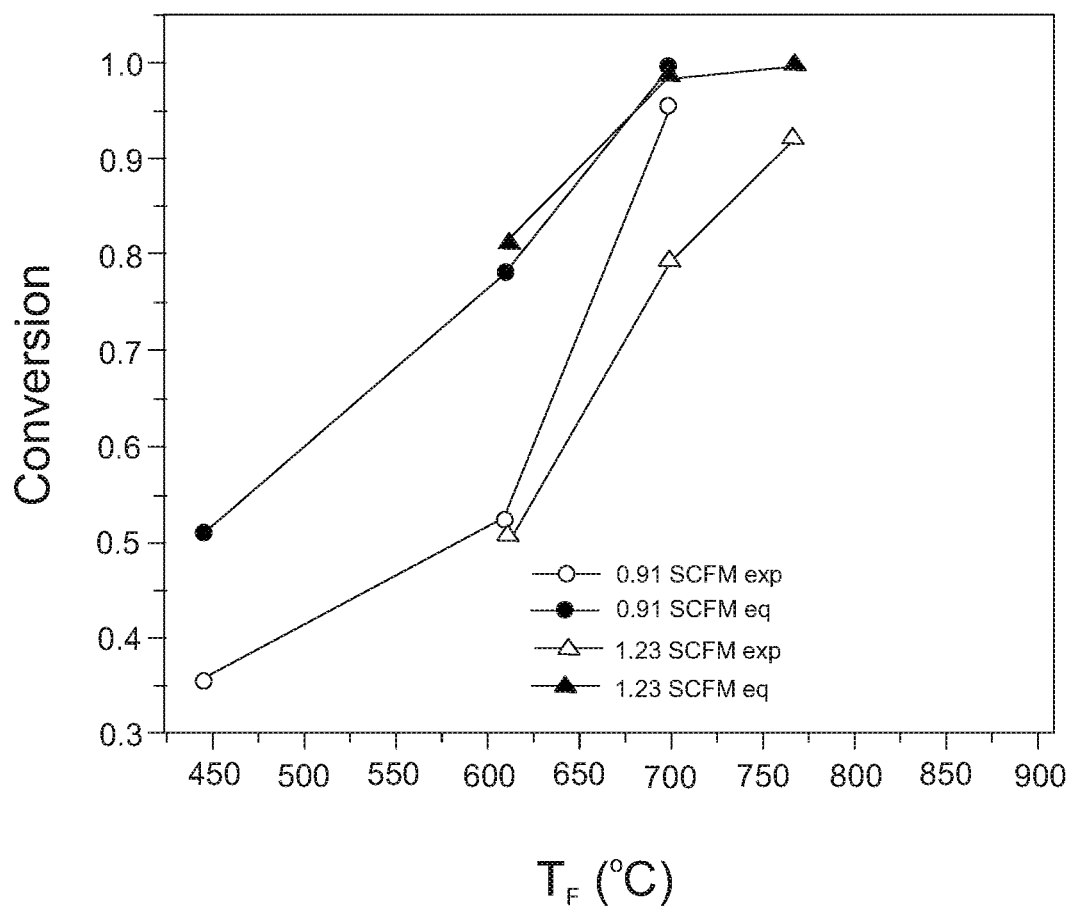
FIG. 7. Experimental conversions and calculated equilibrium conversions as a function of feed temperature TF for two different feed #ow rates of biogas. Other conditions are discussed in ref. Sasan Dabir et al.

Mathematical simulations of the reformer's performance manifest similar behavior, see FIGS. 5 and 6. (For these simulations, the feed pressure was 1.7 bar, the TF=1041 K, and the feed gas consisted of $O_2$: 1.7%, $CO_2$: 29.8%, $CH_4$: 32.2%, and $N_2$: 36.3%. For all cases the $q_V$=1.6 kW, corresponding to the total nominal heating capacity of the two ceramic heaters utilized.) As these figures indicate (see the inset in the figures), for the region of conditions where the reactor operates substantially away from equilibrium (e.g., lower W/F which in this case means higher biogas flow rates as the mass of catalyst in the reactor is maintained constant equal to that used in the experiments), higher (S/C) correspond to lower conversions. At higher W/F (lower biogas flow rates), however, for which the reactor behavior tracks closer the equilibrium conditions, the reactor behavior reverses, and higher (S/C) ratios imply also higher reactor conversions as well. Interesting is the behavior of the calculated concentration of $H_2$ in the exit stream which passes through a maximum when plotted against W/F. This relates to the operational characteristics of the pilot-scale reactor, which is heated from the outside with electric heaters. For larger W/F, equilibrium conversion is attained at an earlier position within the reaction zone and the exit temperature is higher, as a result shifting the equilibrium conversion of R2 to the left. (For the data presented in FIGS. 5 and 6, the calculated exit temperatures range from 814 to 1146 K for the S/C=1 case, 829-1170 K for the S/C=2 case, and 844-1180 K for the S/C=3 case.) Similar nonmonotonic behavior in $H_2$ composition has also been observed experimentally see, e.g., FIG. 4. The impact of increasing the biogas feed flow rate into the reformer, while maintaining the (S/C) ratio (~2.33), feed pressure (~1.7 bar), and feed composition approximately constant, is shown in FIG. 7.

During the study, the engine would be typically started on propane gas. Once the reformer conversion had reached a steady-state value, the gas product from the reformer would be combined with the rest of the flow of the raw biogas, and the gas feed to the engine would be switched from propane to the syngas/LFG mixture via the use of a three-way valve. The fuel flow rate could be also adjusted with the use of a separate globe valve. The pressure of the fuel flow that went into the engine was kept above 1.24 mbar (0.5 in. $H_2O$) in order for the engine to run on the syngas/biogas mixture.

(The usual pressure of the fuel in the combustion experiments was approximately 2.48 mbar (1 in. $H_2O$).) The zero governor on the engine, connected to the propane cylinder along with a pressure regulator, would set the pressure of the fuel at a constant zero pressure when switched from landfill gas to propane gas fuel. The catalytic reformer and the engine operated as a single unit continuously, and during operation, the different system parts were monitored continuously and controlled either manually or by the programmable logic controller (PLC), see the Supporting Information. During the study, the effect of blending the reforming products with unreacted biogas on the engine combustion characteristics were quantitatively assessed. Because of the low concentration of methane (typically ~30%) and the high $N_2$ content (>30%) present in the raw biogas at the Santiago Canyon landfill, the specific engine (DuroMax XP4400EH) utilized in the project did not run on this particular low-BTU content biogas alone, sputtering and never reaching 3600 rpm during operation. However, the engine ran smoothly when operating on (reformer off-gas/biogas) mixtures. With hydrogen being present in the fuel, the engine ran stably for various loads under fuel-lean (i.e., excess-air) conditions, resulting in fairly low-$NO_X$ emissions, when compared to the same engine running on propane (see further discussion below). For example, in experiments in which the flow of fuel was varied (via adjusting the fuel valve), the engine ran under significantly fuel-lean conditions, i.e., with an air-to-fuel equivalence ratio $\lambda$=1.23 without load and $\lambda$=1.17 running on a 3 Amp load, where $\lambda$ is the ratio of actual air-to-fuel ratio (AFR) to that of stoichiometric combustion conditions, $AFR_{st}$, which for these complex fuels is defined as follows:

$$AFR_{st} = \frac{3.762 \times (0.5 \times x \text{ \% } H_2 + 0.5 \times y \text{ \% } CO + 2 \times z \text{ \% } CH4)}{(x \text{ \% } H_2 + y \text{ \% } CO + z \text{ \% } CH4)}$$

Figure 8:
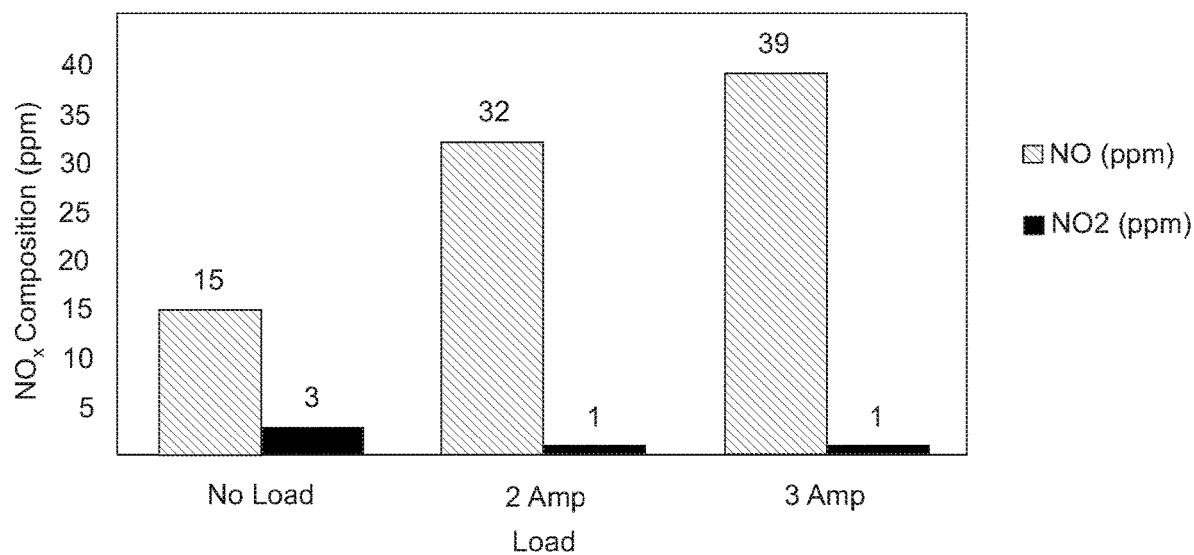
FIG. 8. $NO_X$ (NO, $NO_2$) emission data in the exhaust gas for the engine running on a syngas/biogas mixture with 50% of the total flow of biogas going into the reformer. Three different operating engine regimes: No load, 2 Amp, and 3 Amp load.

FIG. 8, for example, indicates the engine performance when running on a 50% biogas/50% reformate gas mixture containing hydrogen for three different operating engine regimes. (For the experiments in this figure, the reformer conditions were feed pressure of 1.7 bar (10 psig), 1.1 SCMH (0.65 SCFM), S/C=3.4, biogas composition $O_2$: 1.3%, $CO_2$: 31.3%, $CH_4$: 36.3%, and $N_2$: 31.1%, TF=699° C. The gas composition (syngas+raw biogas) fed into the engine was CO: 14.9%, $CO_2$: 18.3%, $CH_4$: 12.6%, $H_2$: 32.4%, $O_2$: 0.44%, and $N_2$: 21.2%.) The $NO_X$ emission data in FIG. 8 were recorded by measuring the NO and $NO_2$ concentrations in the engine exhaust. To do so, before the exhaust gas would flow into the sensor block for the $NO_X$ measurements, the water vapor was removed with the use of thermoelectric Peltier refrigeration cooling system and by passing it through an adsorption column packed with silica gel. All the measurements were conducted at atmospheric pressure. In order for the gas to have enough flow to the sensor block, suction was applied on the exit side of the sensor block by connecting it to the suction port of the landfill blower on the site.

Figure 9:
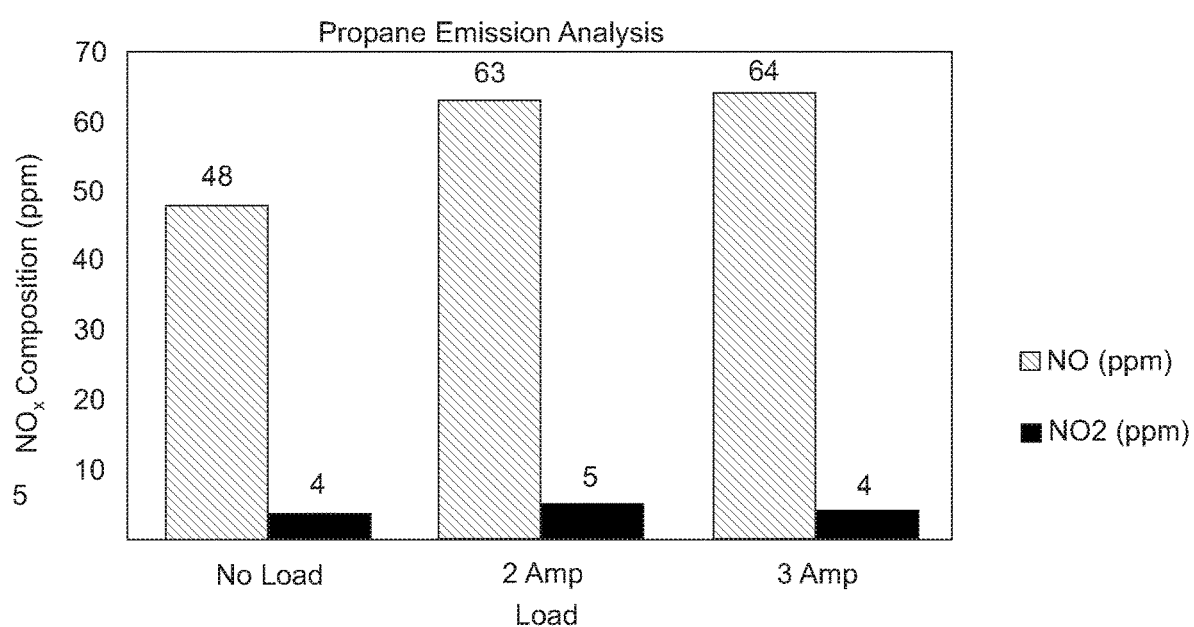
FIG. 9. $NO_X$ (NO, $NO_2$) emission data in the exhaust gas for the engine running on propane for three different operating regimes: No load, 2 Amp, and 3 Amp load.

As noted previously, because of the low concentration of $CH_4$ and the high $N_2$ content of the biogas at the Santiago Canyon landfill, where the field testing took place, the specific engine utilized in the project did not run on biogas alone, sputtering and never reaching 3600 rpm during operation. However, the engine ran smoothly when operating on (reformer off-gas/biogas) mixtures. It was not possible, therefore, to compare the performance of the engine running on (biogas/syngas) to that of the engine running on raw biogas alone. Therefore, as an experimental metric of improved engine performance, the emissions of the engine running on biogas/syngas mixtures were compared with the corresponding emissions with the engine running on propane (because of the remote location of the field site that was the only gaseous fuel that was readily available), which are shown in FIG. 9. Comparing the $NO_X$ emissions from the engine running on propane gas alone (FIG. 9) with those from the engine running on a 50% biogas/50% reformate gas mixture (FIG. 8), under similar loads it is clear that the engine running on (reformer off-gas/biogas) mixtures shows significantly lower emissions than the engine operating on pure propane under the same load conditions (65% $NO_X$ reduction for the no-load case, 51% reduction for the 2 Amp case, and 41% for the 3 Amp case).

Figure 10:
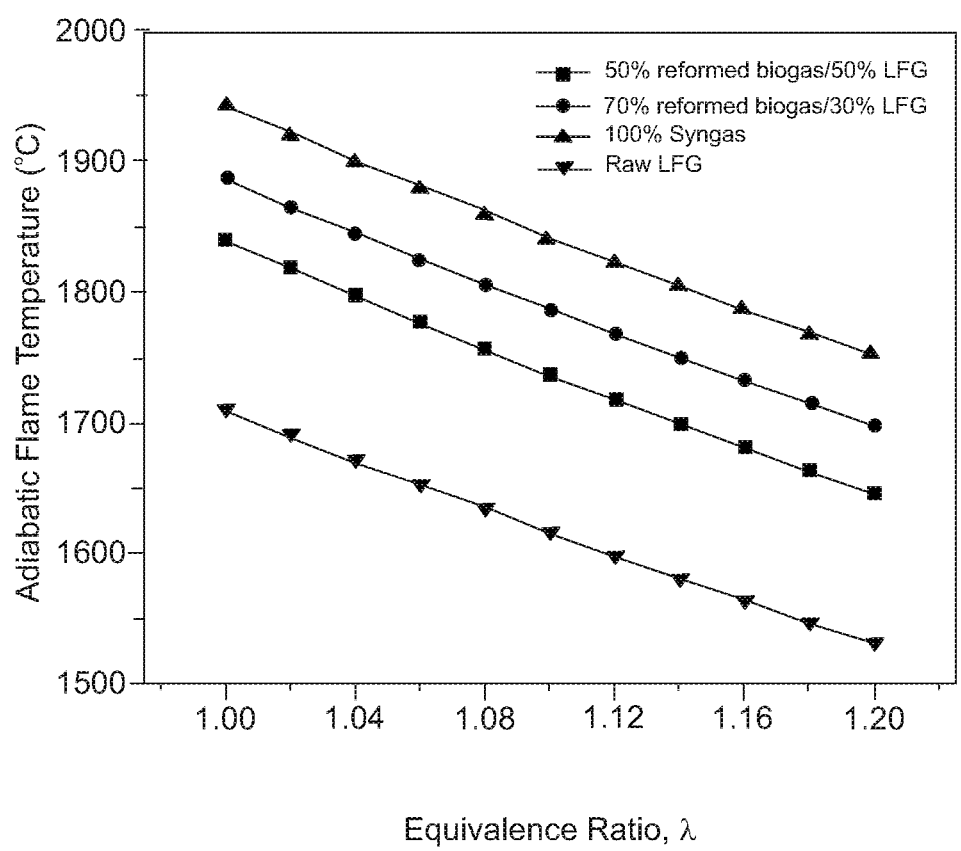
FIG. 10. Adiabatic flame temperature vs the air-to-fuel equivalence ratio & for various gas feed compositions.

The combustion characteristics of NG/syngas mixtures have been analyzed using model experimental combustion configurations.[3,4,30] The blending of syngas with NG was shown to increase combustion stability and to decrease $NO_X$ emissions, very similarly to the behavior that is observed with the biogas/syngas mixtures in this field study (e.g., see FIGS. 16 and 17 in the study of Ren et al.[4]). It goes beyond the scope of this feasibility-type study to investigate the complex reactive flows within the experimental engine, and it was not attempted here. However, to add further insight into the potential of the proposed CR concept, additional simulations were carried out, in which as noted in above the engine is modeled as a flow reactor, in which all relevant reactions have reached equilibrium under adiabatic conditions. FIG. 10 shows the calculated adiabatic flame temperatures as a function of the air-to-fuel equivalence ratio &. (A raw LFG with composition $CH_4$: 32.2%, $O_2$: 1.7%, $CO_2$: 29.8%, and $N_2$: 36.3%; a 50% reformed biogas/50% LFG mixture with composition $CH_4$: 12.6%, $O_2$: 0.4%, $CO_2$: 18.3%, $N_2$: 21.2%, CO: 14.9%, and Hz: 32.4%; a 70% reformed biogas/30% LFG with composition $CH_4$: 6.7%, $O_2$: 0.3%, $CO_2$: 16.7%, $N_2$: 22.9%, CO: 16.4%, and Hz: 36.7%; and a 100% syngas mixture with composition $CH_4$: 1.4%, $O_2$: 0%, $CO_2$: 14.3%, $N_2$: 20.2%, CO: 18.8%, and Hz: 45.3% are studied in this figure).

As shown in FIG. 10, the use of the syngas mixtures results in a significant increase in the adiabatic temperature, which provides a good measure of the amount of waste heat that has been recuperated and of the potential for increase in system efficiency. The waste heat recuperated can also be directly estimated based on the measured gas compositions and the energy content (i.e., lower heating value or LHV of the biogas components), and it is significant. For example, for the case shown in FIG. 8, the (syngas/biogas) mixture contains 12.3% more energy than the raw biogas.

$NO_X$ equilibrium calculations, on the other hand, result in values which are a couple of orders of magnitude higher than what was observed experimentally during field testing, which is an indicator that these processes operate far away from equilibrium, and the improvements in $NO_X$ emissions attained are, instead, the result of complex kinetic processes.[5,102]

The experimental/modeling results of this preliminary, "proof-of-concept" study have been quite promising. On the basis of these findings, a cost feasibility evaluation for an 848 SCMH (500 SCFM) "biogas-to-energy" project was performed to verify whether it would be financially viable (with further details provided in the Supporting Information). Two technologies were compared: the conventional technology, which requires the use of a selective catalytic reduction (SCR) system to allow an engine to operate while satisfying environmental regulations, and the proposed CR system, which is envisioned capable to operate without needing such a SCR system. (The preliminary results reported here are for building a new, "grass-roots" system, but the most likely initial adaptations of the technology will be as retrofit systems for landfills with existing biogas-to-energy facilities, for which biogas quality has declined to the point where the economics of operation are marginal. In these circumstances, the choice will be between abandoning the existing system and flaring the biogas instead or retrofitting it with the CR technology to prolong its operating lifetime. Though flaring is presently still permissible, the development of technologies like the CR system proposed here that permit the beneficial use of such a resource for electricity production may "spur" new regulations that discourage the continuation of present flaring practices.)

For the 848 SCMH size project, the up-front capital cost of the CR system is estimated to be ~$2.83 million, which is higher (by ~$0.37 million) than the cost of the conventional system without a reformer. However, the O&M cost (including $NO_X$ control) of the CR system is lower, with its annual cost ($358,347) being less than that of the conventional system ($415,769). The estimated net annual revenue (annual revenue minus annual cost) for the CR process is $755,925 (with the payback period for the proposed process being 2.7 years), while that for the conventional process is $635,431. It should be pointed out that estimating the costs/revenues of a new and not yet fully developed technology and comparing them against a mature technology is an "in-exact science". It is expected, for example, that once the new technology is fully developed, costs will be reduced. The next phase of development for the proposed CR technology should, therefore, involve testing the technology at a larger scale with the focus on reducing actual costs, by improving heat control, minimizing catalyst volume, and reducing operating costs, and increasing revenue, by optimizing waste heat utilization and maximizing energy efficiency. A key potential "draw" of the proposed CR system for the intended application (closed or minimally staffed landfill sites) is that it is passive; hence, except for minimal equipment maintenance (e.g., cleaning the heat exchangers), there is no additional operation and maintenance costs.

CONCLUSIONS

The performance of a catalytic reformer operating on raw biogas, after undergoing conventional pretreatment for the removal of its trace impurities, was evaluated during this experimental study with respect to product composition and the conversion of the methane component of the biogas for different flow rates (and corresponding residence times) and for various (steam/methane) ratios. The catalytic reformer operated stably for the duration of the tests, with the catalyst showing high activity. Higher reactor residence times and (steam/methane) ratios resulted in higher carbon conversions and in higher hydrogen concentration in the resulting syngas. Reactor performance was also validated by modeling.

Blending the reformer off-gas with the raw landfill gas and using it to generate electricity in an engine was shown experimentally to generate good benefits for the engine performance. For example, the specific engine used in this project would not run on low-BTU content biogas produced at the long-ago closed Santiago Canyon landfill in California, where the field testing took place, sputtering and never running at full-speed (3600 rpm at a frequency of 60 Hz). However, the engine would run smoothly when operating on (reformer off-gas/biogas) mixtures as a result of the addition of the reformate mixture, which made the fuel mixture flammable and resulted in a stable combustion conditions. With the hydrogen present in the LFG, the engine would run stably for various loads under fuel-lean (excess-air) conditions, resulting in low-$NO_X$ emissions (similar observations were recently reported by Zhen and co-workers [102] in a laboratory study with incombustible simulated biogas mixtures, which upon $H_2$ addition became flammable). Specifically, the engine operating on (reformer off-gas/biogas) mixtures showed significantly lower emissions than when operating on pure propane under the same load conditions.

Preliminary estimates are that the technology set forth above has the potential to improve energy efficiency by more than 10% from waste heat recuperation. It should be pointed out that just 1% reduction in fuel use in a large engine (via efficiency improvement) is significant. Having the potential to decrease fuel use by as much as 10% would be a huge advancement for the "waste-to-energy" field.

Fuel reforming has been proposed and applied in the past for diesel engines with technical success[103,104] but has yet to become commercial. However, the economics in diesel engines that do not face operability issues are different than those the biogas industry faces. Currently, the stringent air emissions requirements in various parts of the country, particularly in several air districts within the State of California, preclude the use of stationary IC engines operating on biogas without exhaust gas treatment, primarily because they emit large amounts of $NO_X$, a key regulated pollutant. Also, due to poor flame stability when using marginal or poor-quality biogas, maximum power during biogas combustion may be low, or like in this project, the engine may be totally unable to operate on raw biogas. One way to solve both these problems is to use the proposed CR system in the "biogas-to-energy" process. Finding a clean way of burning biogas in IC engines would be beneficial through utilization of a very important renewable fuel and resource and could help lead it down the path of energy independence without the adverse health effects and cost to the economy of burning fossil fuel resources. This technology, in particular, can help convert poor-quality biogas, that would otherwise be unusable and likely to be flared, to a usable fuel for power generation and in so doing can offer the benefit of offsetting natural gas use elsewhere While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

(1) Correa, S. M. A Review of $NO_X$ Formation under Gas-Turbine Combustion Conditions. Combust. Sci. Technol. 1993, 87, 329-362.

(2) Steele, R.; Jarrett, A.; Malte, P. C.; Tonouchi, J.; Nicol, D. In Variables Affecting $NO_X$ Formation in Lean-Premixed Combustion, ASME 1995 International Gas Turbine and Aeroengine Congress and Exposition, 1995. Am. Soc. Mech. Eng. 1995, V003T06A018-V003 T06A018.

(3) Ren, J. Y.; Qin, W.; Egolfopoulos, F.; Mak, H.; Tsotsis, T. Methane Reforming and Its Potential Effect on the Efficiency and Pollutant Emissions of Lean Methane-Air Combustion. Chem. Eng. Sci. 2001, 56, 1541-1549.

(4) Ren, J. Y.; Egolfopoulos, F.; Tsotsis, T. $NO_X$ Emission Control of Lean Methane-Air Combustion with Addition of Methane Reforming Products. Combust. Sci. Technol. 2002, 174, 181-205.

(5) Sanusi, Y. S.; Habib, M. A.; Mokheimer, E. M. Experimental Study on the Effect of Hydrogen Enrichment of Methane on the Stability and Emission of Nonpremixed Swirl Stabilized Combustor. J. Energy Resour. Technol. 2015, 137, 032203.

(6) Park, C.; Kim, C.; Choi, Y.; Won, S.; Moriyoshi, Y. The Influences of Hydrogen on the Performance and Emission Characteristics of a Heavy Duty Natural Gas Engine. Int. J. Hydrogen Energy 2011, 36, 3739-3745.

(7) Garcia, L. Hydrogen Production by Steam Reforming of Natural Gas and Other Nonrenewable Feedstocks. Compendium of Hydrogen Energy 2015, 83-107.

(8) Levin, D. B.; Pitt, L.; Love, M. Biohydrogen Production: Prospects and Limitations to Practical Application. Int. J. Hydrogen Energy 2004, 29, 173-185.

(9) Soltani, S.; Sahimi, M.; Tsotsis, T. Catalytic Membrane Reactors: A Brief Overview. Encyclopedia of Membrane Science and Technology 2013, DOI: 10.1002/9781118522318.emst110.

(10) Wu, Y. J.; Li, P.; Yu, J.-G.; Cunha, A. F.; Rodrigues, A. E. Progress on Sorption-Enhanced Reaction Process for Hydrogen Production. Rev. Chem. Eng. 2016, 32, 271-303.

(11) Liu, P. K.; Sahimi, M.; Tsotsis, T. T. Process Intensification in Hydrogen Production from Coal and Biomass Via the Use of Membrane-Based Reactive Separations. Curr. Opin. Chem. Eng. 2012, 1, 342-351.

(12) Kersten, S. R.; Prins, W.; Van der Drift, B.; van Swaaij, W. P. Principles of a Novel Multistage Circulating Fluidized Bed Reactor for Biomass Gasification. Chem. Eng. Sci. 2003, 58, 725-731.

(13) Wu, Z.; Wu, C.; Huang, H.; Zheng, S.; Dai, X. Test Results and Operation Performance Analysis of a 1-Mw Biomass Gasification Electric Power Generation System. Energy Fuels 2003, 17, 619-624.

(14) de Souza-Santos, M. L. A Study of Thermochemically Recuperative Power Generation Systems Using Natural Gas. Fuel 1997, 76, 593-601.

(15) Harvey, S.; Kane, N. Analysis of a Reheat Gas Turbine Cycle with Chemical Recuperation Using Aspen. Energy Conyers. Manage. 1997, 38, 1671-1679.

(16) Meyers, D.; Kubesh, J. The Hybrid Rich-Burn/Lean-Burn Engine. J. Eng. Gas Turbines Power 1997, 119, 243-249.

(17) Jeong, C.; Kim, T.; Lee, K.; Song, S.; Chun, K. M. Generating Efficiency and Emissions of a Spark-Ignition Gas Engine Generator Fuelled with Biogas-Hydrogen Blends. Int. J. Hydrogen Energy 2009, 34, 9620-9627.

(18) Yoon, S. H.; Lee, C. S. Experimental Investigation on the Combustion and Exhaust Emission Characteristics of Biogas-Biodiesel Dual-Fuel Combustion in a CI Engine. Fuel Process. Technol. 2011, 92, 992-1000.

(19) Rostrup-Nielsen, J. R. Syngas in Perspective. Catal. Today 2002, 71, 243-247.

(20) Twigg, M. Catalyst Handbook, 2nd ed.; Manson Publishing: London, 1996.

(21) Rodriguez, J.; Romeo, E.; Fierro, J.; Santamaria, J.; Monzon, A. Deactivation by Coking and Poisoning of Spinel-Type Ni Catalysts. Catal. Today 1997, 37, 255-265.

(22) Bengaard, H. S.; Nørskov, J. K.; Sehested, J.; Clausen, B.; Nielsen, L.; Molenbroek, A.; Rostrup-Nielsen, J. Steam Reforming and Graphite Formation on Ni Catalysts. J. Catal. 2002, 209, 365-384.

(23) Li, C. l.; Fu, Y. l.; Bian, G. Z.; Xie, Y. N.; Hu, T. D.; Zhang, J. Effect of Steam in CO2 Reforming of CH4 over a Ni/CeO2-ZrO2-Al2O3 Catalyst. Kinet. Catal. 2004, 45, 679-683.

(24) Urasaki, K.; Sekine, Y.; Kawabe, S.; Kikuchi, E.; Matsukata, M. Catalytic Activities and Coking Resistance of Ni/Perovskites in Steam Reforming of Methane. Appl. Catal., A 2005, 286, 23-29.

(25) Sangsong, S.; Phongaksorn, M.; Tungkamani, S.; Sornchamni, T.; Chuvaree, R. Dry Methane Reforming Performance of Ni-Based Catalyst Coated onto Stainless Steel Substrate. Energy Procedia 2015, 79, 137-142.

(26) Kho, E. T.; Amal, R.; Scott, J. Ni/TiO2 for Low Temperature Steam Reforming of Methane. Chem. Eng. Sci. 2016, 140, 10. (27) Boehman, A. L.; Corre, O. L. Combustion of Syngas in Internal Combustion Engines. Combust. Sci. Technol. 2008, 180, 1193-1206.

(28) Sung, C. J.; Law, C. K. Fundamental Combustion Properties of H2/CO Mixtures: Ignition and Flame Propagation at Elevated Pressures. Combust. Sci. Technol. 2008, 180, 1097-1116.

(29) Olm, C.; Zsely, I. G.; Varga, T.; Curran, H. J.; Turanyi, T. Comparison of the Performance of Several Recent Syngas Combustion Mechanisms. Combust. Flame 2015, 162, 1793-1812.

(30) Ren, J. Y.; Qin, W.; Egolfopoulos, F.; Tsotsis, T. Strain-Rate Effects on Hydrogen-Enhanced Lean Premixed Combustion. Combust. Flame 2001, 124, 717-720.

(31) Emadi, M.; Karkow, D.; Salameh, T.; Gohil, A.; Ratner, A. Flame Structure Changes Resulting from Hydrogen-Enrichment and Pressurization for Low-Swirl Premixed Methane-Air Flames. Int. J. Hydrogen Energy 2012, 37, 10397-10404.

(32) Fu, J.; Tang, C.; Jin, W.; Thi, L. D.; Huang, Z.; Zhang, Y. Study on Laminar Flame Speed and Flame Structure of Syngas with Varied Compositions Using OH-PLIF and Spectrograph. Int. J. Hydrogen Energy 2013, 38, 1636-1643.

(33) Griebel, P.; Boschek, E.; Jansohn, P. Lean Blowout Limits and $NO_X$ Emissions of Turbulent, Lean Premixed, Hydrogen-Enriched Methane/Air Flames at High Pressure. J. Eng. Gas Turbines Power 2007, 129, 404-410.

(34) Hagos, F. Y.; Aziz, A. R. A.; Sulaiman, S. A. Syngas (H2/CO) in a Spark-Ignition Direct-Injection Engine. Part 1: Combustion, Performance and Emissions Comparison with CNG. Int. J. Hydrogen Energy 2014, 39, 17884-17895.

(35) Hraiech, I.; Sautet, J. C.; Yon, S.; Mhimid, A. Combustion of Hythane Diluted with CO2. Therm. Sci. 2015, 19, 1-10.

(36) Ilbas, M.; Crayford, A.; Yilmaz, I.; Bowen, P.; Syred, N. Laminar-Burning Velocities of Hydrogen-Air and Hydrogen-Methane-Air Mixtures: An Experimental Study. Int. J. Hydrogen Energy 2006, 31, 1768-1779.

(37) Khalil, A. E.; Gupta, A. K. Hydrogen Addition Effects on High Intensity Distributed Combustion. Appl. Energy 2013, 104, 71-78.

(38) Lim, G.; Lee, S.; Park, C.; Choi, Y.; Kim, C. Effect of Ignition Timing Retard Strategy on $NO_X$ Reduction in Hydrogen-Compressed Natural Gas Blend Engine with Increased Compression Ratio. Int. J. Hydrogen Energy 2014, 39, 2399-2408.

(39) Littlejohn, D.; Majeski, A. J.; Tonse, S.; Castaldini, C.; Cheng, R. K. Laboratory Investigation of an Ultralow

(40) Liu, J.; Zhang, X.; Wang, T.; Hou, X.; Zhang, J.; Zheng, S. Numerical Study of the Chemical, Thermal and Diffusion Effects of H2 and CO Addition on the Laminar Flame Speeds of Methane-Air Mixture. Int. J. Hydrogen Energy 2015, 40, 8475-8483.

(41) Mordaunt, C. J.; Pierce, W. C. Design and Preliminary Results of an Atmospheric-Pressure Model Gas Turbine Combustor Utilizing Varying CO2 Doping Concentration in CH4 to Emulate Biogas Combustion. Fuel 2014, 124, 258-268.

(42) Moreno, F.; Arroyo, J.; Munoz, M.; Monne, C. Combustion Analysis of a Spark Ignition Engine Fueled with Gaseous Blends Containing Hydrogen. Int. J. Hydrogen Energy 2012, 37, 13564-13573.

(43) Park, C.; Park, S.; Lee, Y.; Kim, C.; Lee, S.; Moriyoshi, Y. Performance and Emission Characteristics of a SI Engine Fueled by Low Calorific Biogas Blended with Hydrogen. Int. J. Hydrogen Energy 2011, 36, 10080-10088.

(44) Porpatham, E.; Ramesh, A.; Nagalingam, B. Effect of Hydrogen Addition on the Performance of a Biogas Fuelled Spark Ignition Engine. Int. J. Hydrogen Energy 2007, 32, 2057-2065.

(45) Ruter, M. D.; Olsen, D. B.; Scotto, M. V.; Perna, M. A. $NO_X$ Reduction from a Large Bore Natural Gas Engine Via Reformed Natural Gas Prechamber Fueling Optimization. Fuel 2012, 91, 298-306.

(46) Sayad, P.; Scho&nborn, A.; Klingmann, J. Experimental Investigations of the Lean Blowout Limit of Different Syngas Mixtures in an Atmospheric, Premixed, Variable-Swirl Burner. Energy Fuels 2013, 27, 2783-2793.

(47) Schefer, R. Hydrogen Enrichment for Improved Lean Flame Stability. Int. J. Hydrogen Energy 2003, 28, 1131-1141.

(48) Shrestha, S. B.; Karim, G. Hydrogen as an Additive to Methane for Spark Ignition Engine Applications. Int. J. Hydrogen Energy 1999, 24, 577-586.

(49) Shrestha, S. B.; Narayanan, G. Landfill Gas with Hydrogen Addition—a Fuel for SI Engines. Fuel 2008, 87, 3616-3626.

(50) Delattin, F.; Di Lorenzo, G.; Rizzo, S.; Bram, S.; De Ruyck, J. Combustion of Syngas in a Pressurized Microturbine-Like Combustor: Experimental Results. Appl. Energy 2010, 87, 1441-1452.

(51) Delattin, F.; Rabhiou, A.; Bram, S.; Ruyck, J. D.; Orbay, R.; Klingmann, J.; Konnov, A. A. A Comparison between the Combustion of Natural Gas and Partially Reformed Natural Gas in an Atmospheric Lean Premixed Turbine-Type Combustor. Combust. Sci. Technol. 2008, 180, 1478-1501.

(52) Coppens, F.; De Ruyck, J.; Konnov, A. Effects of Hydrogen Enrichment on Adiabatic Burning Velocity and NO Formation in Methane+ Air Flames. Exp. Therm. Fluid Sci. 2007, 31, 437-444.

(53) Fackler, K. B.; Karalus, M.; Novosselov, I.; Kramlich, J.; Malte, P.; Vijlee, S. $NO_X$ Behavior for Lean-Premixed Combustion of Alternative Gaseous Fuels. J. Eng. Gas Turbines Power 2016, 138, 041504.

(54) Fackler, K. B.; Karalus, M. F.; Novosselov, I. V.; Kramlich, J. C.; Malte, P. C. Experimental and Numerical Study of $NO_X$ Formation from the Lean Premixed Combustion of CH4 Mixed with CO2 and N2. J. Eng. Gas Turbines Power 2011, 133, 121502.

(55) Go&ke, S.; Furi, M.; Bourque, G.; Bobusch, B.; Gockeler, K.; Kruger, O.; Schimek, S.; Terhaar, S.; Paschereit, C. O. Influence of Steam Dilution on the Combustion of Natural Gas and Hydrogen in Premixed and Rich-Quench-Lean Combustors. Fuel Process. Technol. 2013, 107, 14-22.

(56) Lee, M. C.; Seo, S. B.; Yoon, J.; Kim, M.; Yoon, Y. Experimental Study on the Effect of $N_2$, $CO_2$, and Steam Dilution on the Combustion Performance of H2 and CO Synthetic Gas in an Industrial Gas Turbine. Fuel 2012, 102, 431-438.

(57) Gauthier, S.; Nicolle, A.; Baillis, D. Investigation of the Flame Structure and Nitrogen Oxides Formation in Lean Porous Premixed Combustion of Natural Gas/Hydrogen Blends. Int. J. Hydrogen Energy 2008, 33, 4893-4905.

(58) Giles, D. E.; Som, S.; Aggarwal, S. K. $NO_X$ Emission Characteristics of Counterflow Syngas Diffusion Flames with Air-stream Dilution. Fuel 2006, 85, 1729-1742.

(59) Watson, G. M.; Munzar, J. D.; Bergthorson, J. M. NO Formation in Model Syngas and Biogas Blends. Fuel 2014, 124, 113-124.

(60) Alavandi, S.; Agrawal, A. Experimental Study of Combustion of Hydrogen-Syngas/Methane Fuel Mixtures in a Porous Burner. Int. J. Hydrogen Energy 2008, 33, 1407-1415.

(61) Arrieta, C. E.; Amell, A. A. Combustion Analysis of an Equimolar Mixture of Methane and Syngas in a Surface-Stabilized Combustion Burner for Household Appliances. Fuel 2014, 137, 11-20.

(62) Arroyo, J.; Moreno, F.; Munoz, M.; Monne, C. Efficiency and Emissions of a Spark Ignition Engine Fueled with Synthetic Gases Obtained from Catalytic Decomposition of Biogas. Int. J. Hydrogen Energy 2013, 38, 3784-3792.

(63) Arroyo, J.; Moreno, F.; Munoz, M.; Monne, C.; Bernal, N. Combustion Behavior of a Spark Ignition Engine Fueled with Synthetic Gases Derived from Biogas. Fuel 2014, 117, 50-58.

(64) Azimov, U.; Tomita, E.; Kawahara, N.; Harada, Y. Effect of Syngas Composition on Combustion and Exhaust Emission Character-istics in a Pilot-Ignited Dual-Fuel Engine Operated in Premier Combustion Mode. Int. J. Hydrogen Energy 2011, 36, 11985-11996.

(65) Chen, W. T. Effects of CO Addition on the Lean Premixed CH4/Air Flame. Acta Physico-Chimica Sinica 2010, 26, 1481-1487.

(66) Chen, L.; Shiga, S.; Araki, M. Combustion Characteristics of an SI Engine Fueled with H2-CO Blended Fuel and Diluted by CO2. Int. J. Hydrogen Energy 2012, 37, 14632-14639.

(67) Cheng, T.; Chang, Y. C.; Chao, Y. C.; Chen, G.-B.; Li, Y. H.; Wu, C. Y. An Experimental and Numerical Study on Characteristics of Laminar Premixed H2/CO/CH4/Air Flames. Int. J. Hydrogen Energy 2011, 36, 13207-13217.

(68) Hawkes, E. R.; Chen, J. H. Direct Numerical Simulation of Hydrogen-Enriched Lean Premixed Methane-Air Flames. Combust. Flame 2004, 138, 242-258.

(69) He, Y.; Wang, Z.; Yang, L.; Whiddon, R.; Li, Z.; Zhou, J.; Cen, K. Investigation of Laminar Flame Speeds of Typical Syngas Using Laser Based Bunsen Method and Kinetic Simulation. Fuel 2012, 95, 206-213.

(70) Hu, E.; Huang, Z.; Zheng, J.; Li, Q.; He, J. Numerical Study on Laminar Burning Velocity and NO Formation of Premixed Methane-Hydrogen-Air Flames. Int. J. Hydrogen Energy 2009, 34, 6545-6557.

(71) Huang, Z.; Zhang, Y.; Zeng, K.; Liu, B.; Wang, Q.; Jiang, D. Measurements of Laminar Burning Velocities for Natural Gas-Hydrogen-Air Mixtures. Combust. Flame 2006, 146, 302-311.

(72) Laget, O.; Richard, S.; Serrano, D.; Soleri, D. Combining Experimental and Numerical Investigations to Explore the Potential of Downsized Engines Operating with Methane/Hydrogen Blends. Int. J. Hydrogen Energy 2012, 37, 11514-11530.

(73) Liu, C.; Yan, B.; Chen, G.; Bai, X. S. Structures and Burning Velocity of Biomass Derived Gas Flames. Int. J. Hydrogen Energy 2010, 35, 542-555.

(74) Mandilas, C.; Ormsby, M.; Sheppard, C.; Woolley, R. Effects of Hydrogen Addition on Laminar and Turbulent Premixed Methane and Iso-octane-Air Flames. Proc. Combust. Inst. 2007, 31, 1443-1450.

(75) Tahtouh, T.; Halter, F.; Samson, E.; Mounaïm-Rousselle, C. Effects of Hydrogen Addition and Nitrogen Dilution on the Laminar Flame Characteristics of Premixed Methane-Air Flames. Int. J. Hydrogen Energy 2009, 34, 8329-8338.

(76) Wang, J.; Huang, Z.; Kobayashi, H.; Ogami, Y. Laminar Burning Velocities and Flame Characteristics of CO—H2-CO2-O2 Mixtures. Int. J. Hydrogen Energy 2012, 37, 19158-19167.

(77) Wang, Z.; Weng, W.; He, Y.; Li, Z.; Cen, K. Effect of H2/CO Ratio and N2/CO2 Dilution Rate on Laminar Burning Velocity of Syngas Investigated by Direct Measurement and Simulation. Fuel 2015, 141, 285-292.

(78) Zahedi, P.; Yousefi, K. Effects of Pressure and Carbon Dioxide, Hydrogen and Nitrogen Concentration on Laminar Burning Velocities and NO Formation of Methane-Air Mixtures. J. Mech. Sci. Technol. 2014, 28, 377-386.

(79) Zhang, Y.; Shen, W.; Fan, M.; Zhang, H.; Li, S. Laminar Flame Speed Studies of Lean Premixed $H_2$/CO/Air Flames. Combust. Flame 2014, 161, 2492-2495.

(80) Hu, E.; Fu, J.; Pan, L.; Jiang, X.; Huang, Z.; Zhang, Y. Experimental and Numerical Study on the Effect of Composition on Laminar Burning Velocities of H2/CON2/CO2/Air Mixtures. Int. J. Hydrogen Energy 2012, 37, 18509-18519.

(81) Cheng, Y.; Tang, C.; Huang, Z. Kinetic Analysis of $H_2$ Addition Effect on the Laminar Flame Parameters of the C1-C4 n-Alkane-Air Mixtures: From One Step Overall Assumption to Detailed Reaction Mechanism. Int. J. Hydrogen Energy 2015, 40, 703-718.

(82) Halter, F.; Chauveau, C.; Djebaili-Chaumeix, N.; Gokalp, I. Characterization of the Effects of Pressure and Hydrogen Concen-tration on Laminar Burning Velocities of Methane-Hydrogen-Air Mixtures. Proc. Combust. Inst. 2005, 30, 201-208.

(83) Coppens, F. H.; Konnov, A. A. The Effects of Enrichment by $H_2$ on Propagation Speeds in Adiabatic Flat and Cellular Premixed Flames of CH4+O2+CO2. Fuel 2008, 87, 2866-2870.

(84) Das, A. K.; Kumar, K.; Sung, C.-J. Laminar Flame Speeds of Moist Syngas Mixtures. Combust. Flame 2011, 158, 345-353. (85) Singh, D.; Nishiie, T.; Tanvir, S.; Qiao, L. An Experimental and Kinetic Study of Syngas/Air Combustion at Elevated Temperatures and the Effect of Water Addition. Fuel 2012, 94, 448-456.

(86) Pugh, D. G.; Crayford, A. P.; Bowen, P. J.; Al-Naama, M. Parametric Investigation of Water Loading on Heavily Carbonaceous Syngases. Combust. Flame 2016, 164, 126-136.

(87) He, Y.; Wang, Z.; Weng, W.; Zhu, Y.; Zhou, J.; Cen, K. Effects of CO Content on Laminar Burning Velocity of Typical Syngas by Heat Flux Method and Kinetic Modeling. Int. J. Hydrogen Energy 2014, 39, 9534-9544.

(88) Hinton, N.; Stone, R. Laminar Burning Velocity Measurements of Methane and Carbon Dioxide Mixtures (Biogas) over Wide Ranging Temperatures and Pressures. Fuel 2014, 116, 743-750.

(89) Delmas, M. A.; Burbano, V. C. The Drivers of Greenwashing. Calif. Manage Rev. 2011, 54, 64-87.

(90) Kishore, V. R.; Ravi, M.; Ray, A. Adiabatic Burning Velocity and Cellular Flame Characteristics of H2-CO—CO2-Air Mixtures. Combust. Flame 2011, 158, 2149-2164.

(91) Lapalme, D.; Seers, P. Influence of $CO_2$, $CH_4$, and Initial Temperature on H2/CO Laminar Flame Speed. Int. J. Hydrogen Energy 2014, 39, 3477-3486.

(92) Zhang, Y.; Shen, W.; Zhang, H.; Wu, Y.; Lu, J. Effects of Inert Dilution on the Propagation and Extinction of Lean Premixed Syngas/Air Flames. Fuel 2015, 157, 115-121.

(93) Prathap, C.; Ray, A.; Ravi, M. Effects of Dilution with Carbon Dioxide on the Laminar Burning Velocity and Flame Stability of H2-CO Mixtures at Atmospheric Condition. Combust. Flame 2012, 159, 482-492.

(94) De Smet, C.; De Croon, M.; Berger, R.; Marin, G.; Schouten, J. Design of Adiabatic Fixed-Bed Reactors for the Partial Oxidation of Methane to Synthesis Gas. Application to Production of Methanol and Hydrogen-for-Fuel-Cells. Chem. Eng. Sci. 2001, 56, 4849-4861.

(95) Numaguchi, T.; Kikuchi, K. Intrinsic Kinetics and Design Simulation in a Complex Reaction Network; Steam-Methane Reforming. Chem. Eng. Sci. 1988, 43, 2295-2301.

(96) Fayyaz, B.; Harale, A.; Park, B. G.; Liu, P. K.; Sahimi, M.; Tsotsis, T. T. Design Aspects of Hybrid Adsorbent-Membrane Reactors for Hydrogen Production. Ind. Eng. Chem. Res. 2005, 44, 9398-9408.

(97) Wilke, C. A Viscosity Equation for Gas Mixtures. J. Chem. Phys. 1950, 18, 517-519.

(98) Green, D. W.; Perry, R. H. Perry's Chemical Engineers' Handbook, 8th ed.; McGraw-Hill: New York, 2008.

(99) Elliott, J. R.; Lira, C. T. Introductory Chemical Engineering Thermodynamics, 2nd ed.; Prentice Hall, 2012.

(100) Mbodji, M.; Commenge, J. M.; Falk, L.; Di Marco, D.; Rossignol, F.; Prost, L.; Valentin, S.; Joly, R.; Del-Gallo, P. Steam Methane Reforming Reaction Process Intensification by Using a Millistructured Reactor: Experimental Setup and Model Validation for Global Kinetic Reaction Rate Estimation. Chem. Eng. J. 2012, 207-208, 871-884.

(101) Dabir, S. Biogas Reforming: Conventional and Reactive Separation Processes and the Preparation and Charcterization of Related Materials. Ph.D. Dissertation, University of Southern California, 2016.

(102) Zhen, H.; Wei, Z.; Leung, C.; Cheung, C.; Huang, Z. Emission of Impinging Biogas/Air Premixed Flame with Hydrogen Enrichment. Int. J. Hydrogen Energy 2016, 41, 2087-2095.

(103) Christodoulou, F.; Megaritis, A. The Effect of Reformer Gas Mixture on the Performance and Emissions of an HSDI Diesel Engine. Int. J. Hydrogen Energy 2014, 39, 9798-9808.

(104) Christodoulou, F.; Megaritis, A. Experimental Investigation of the Effects of Simultaneous Hydrogen and Nitrogen Addition on the Emissions and Combustion of a Diesel Engine. Int. J. Hydrogen Energy 2014, 39, 2692-2702.

What is claimed is:

1. A method comprising:
combining a first stream of biogas with an oxygen-containing stream to form a combined stream, the first stream of biogas including methane;
feeding the combined stream to a catalytic reforming reactor in which biogas reacts with an oxygen-containing compound to form a first product stream comprising synthesis gas;
exchanging heat between the first product stream and the oxygen-containing stream to heat the oxygen-containing stream;
combining the first product stream with a second stream of biogas to form a second product stream, the second stream of biogas including methane;
providing the second product stream to a device powered by combustion; and
exchanging heat between flue gas from the device powered by combustion and the first stream of biogas to heat the first stream of biogas.

2. The method of claim 1 wherein the oxygen-containing compound is steam.

3. The method of claim 2 wherein a weight ratio of steam to methane is from about 1 to 5.

4. The method of claim 1 wherein the device powered by combustion is operated under lean-burn conditions.

5. The method of claim 4 wherein the device powered by combustion is operated under lean-burn conditions with an air-to-fuel equivalence ratio greater than 1.

6. The method of claim 1 wherein the device powered by combustion is an electric generator.

7. The method of claim 1 wherein heat is transferred from the device powered by combustion to the catalytic reforming reactor.

8. The method of claim 1 wherein the oxygen-containing compound is carbon monoxide.

9. The method of claim 1 wherein the combined stream is heated to a temperature from about 550° C. to about 850° C. before being fed to the catalytic reforming reactor.

10. The method of claim 1 wherein the catalytic reforming reactor contains a catalyst that includes nickel.

11. The method of claim 1 wherein the catalytic reforming reactor contains a catalyst that includes a noble metal.

12. The method of claim 1 wherein the catalytic reforming reactor contains a catalyst that includes platinum, ruthenium or palladium.

13. The method of claim 1 wherein the first stream of biogas includes flue gas from a rich-burn engine.

* * * * *